United States Patent
Brandt et al.

(10) Patent No.: US 11,113,578 B1
(45) Date of Patent: Sep. 7, 2021

(54) LEARNED MODEL-BASED IMAGE RENDERING

(71) Applicant: Adobe Inc., San Jose, CA (US)

(72) Inventors: Jonathan Brandt, Santa Cruz, CA (US); Radomir Mech, Mountain View, CA (US); Ning Xu, Milpitas, CA (US); Byungmoon Kim, San Jose, CA (US); Biao Jia, Lanham, MD (US)

(73) Assignee: Adobe, Inc., San Jose, CA (US)

( * ) Notice: Subject to any disclaimer, the term of this patent is extended or adjusted under 35 U.S.C. 154(b) by 0 days.

(21) Appl. No.: 16/847,270

(22) Filed: Apr. 13, 2020

(51) Int. Cl.
*G06K 9/62* (2006.01)
*G06N 3/08* (2006.01)

(52) U.S. Cl.
CPC ......... *G06K 9/6269* (2013.01); *G06K 9/6232* (2013.01); *G06K 9/6256* (2013.01); *G06N 3/08* (2013.01)

(58) Field of Classification Search
CPC .. G06K 9/6269; G06K 9/6256; G06K 9/6232; G06K 9/4652; G06K 9/00416; G06K 9/46; G06K 9/4661; G06K 9/52; G06K 9/6267; G06T 11/001; G06T 11/00; G06T 11/60; G06T 11/20; G06T 11/203; G06T 2207/20084; G06T 2207/20081; G06T 2207/20221; G06T 2207/10016; G06T 2207/20112; G06N 3/0454; G06N 3/0472; G06N 3/08; G06N 3/088; G06N 3/04; G06N 3/0445; G06N 3/0481
See application file for complete search history.

(56) References Cited

U.S. PATENT DOCUMENTS

| 9,020,260 | B2 * | 4/2015 | Yokoyama | G06T 11/60 382/173 |
| 9,092,889 | B2 * | 7/2015 | Sakamaki | G06T 11/00 |

(Continued)

OTHER PUBLICATIONS

"Neural Painters: A learned differentiable constraint for generating brushstroke paintings"; Reiichiro Nakano, arXiv:1904.08410v2 [cs. CV] Apr. 22, 2019 (Year: 2019).*

(Continued)

*Primary Examiner* — Michael S Osinski
(74) *Attorney, Agent, or Firm* — Nicholson DeVos Webster & Elliott LLP

(57) ABSTRACT

A non-photorealistic image rendering system and related techniques are described herein that train and implement machine learning models to reproduce digital images in accordance with various painting styles and constraints. The image rendering system can include a machine learning system that utilizes actor-critic based reinforcement learning techniques to train painting agents (e.g., models that include one or more neural networks) how to transform images into various artistic styles with minimal loss between the original images and the transformed images. The image rendering system can generate constrained painting agents, which correspond to painting agents that are further trained to reproduce images in accordance with one or more constraints. The constraints may include limitations of the color, width, size, and/or position of brushstrokes within reproduced images. These constrained painting agents may provide users with robust, flexible, and customizable non-photorealistic painting systems.

20 Claims, 20 Drawing Sheets

(56) References Cited

U.S. PATENT DOCUMENTS

| | | | |
|---|---|---|---|
| 9,449,253 B2* | 9/2016 | Fang | G06K 9/46 |
| 10,147,459 B2* | 12/2018 | Rymkowski | G11B 27/031 |
| 10,504,267 B2* | 12/2019 | Simons | G06T 7/90 |
| 10,916,001 B2* | 2/2021 | Lu | G06N 3/08 |
| 10,964,100 B2* | 3/2021 | Sun | G06F 3/04883 |
| 2002/0118209 A1* | 8/2002 | Hylen | G03B 1/48 345/582 |
| 2003/0095701 A1* | 5/2003 | Shum | G06T 11/00 382/155 |
| 2008/0130993 A1* | 6/2008 | Higashimoto | H04N 1/603 382/167 |
| 2009/0010534 A1* | 1/2009 | Suzuki | H04N 1/6033 382/166 |
| 2009/0122081 A1* | 5/2009 | Tsubaki | G06T 3/4007 345/619 |
| 2010/0315315 A1* | 12/2010 | Osborne | G09G 3/20 345/1.3 |
| 2012/0084661 A1* | 4/2012 | Gil | G06F 3/0482 715/738 |
| 2012/0133664 A1* | 5/2012 | Zhu | G06T 11/001 345/582 |
| 2013/0155069 A1* | 6/2013 | Borders | G06F 9/451 345/441 |
| 2015/0310305 A1* | 10/2015 | Fang | G06K 9/4652 345/441 |
| 2018/0068463 A1* | 3/2018 | Risser | G06T 7/45 |
| 2018/0150947 A1* | 5/2018 | Lu | G06T 11/00 |
| 2019/0188886 A1* | 6/2019 | Gupta | G06K 9/00416 |
| 2019/0392624 A1* | 12/2019 | Elgammal | G06T 11/001 |
| 2020/0105029 A1* | 4/2020 | Jung | H04N 5/00 |
| 2020/0151938 A1* | 5/2020 | Shechtman | G06N 3/08 |
| 2020/0327316 A1* | 10/2020 | Du | G06T 11/001 |
| 2020/0357099 A1* | 11/2020 | Long | G06T 5/005 |
| 2020/0364910 A1* | 11/2020 | Price | G06T 11/203 |
| 2021/0076016 A1* | 3/2021 | Sviridenko | G06T 11/203 |
| 2021/0110220 A1* | 4/2021 | Lee | G06K 9/66 |

OTHER PUBLICATIONS

"PaintBot: A Reinforcement Learning Approach for Natural Media Painting"; Biao Jia, arXiv:1904.02201v1 [cs.CV] Apr. 3, 2019 (Year: 2019).*

* cited by examiner

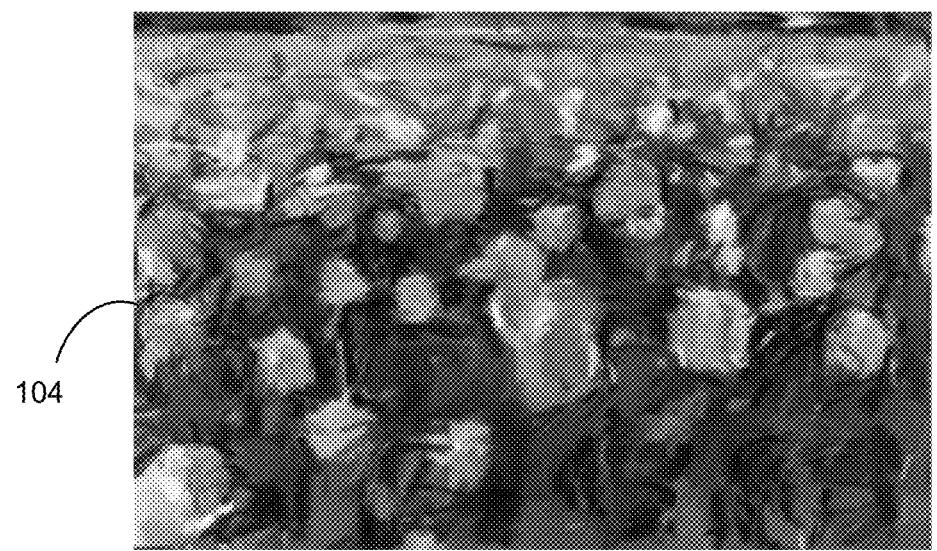
FIG. 1A

FIG. 1B

FIG. 1C

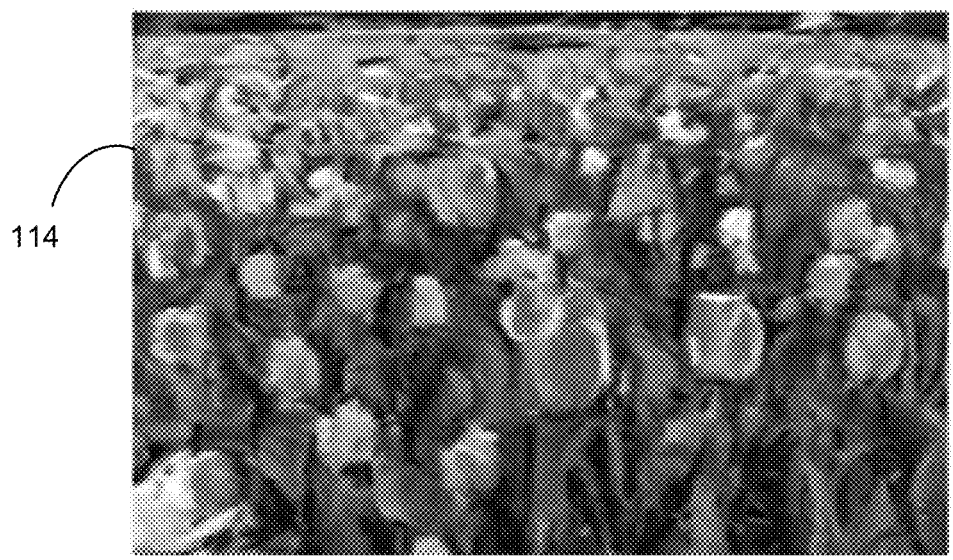
FIG. 1D

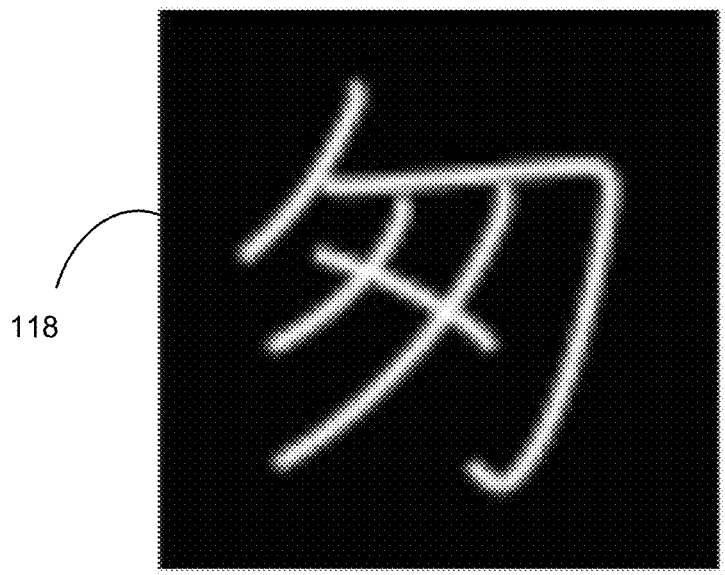
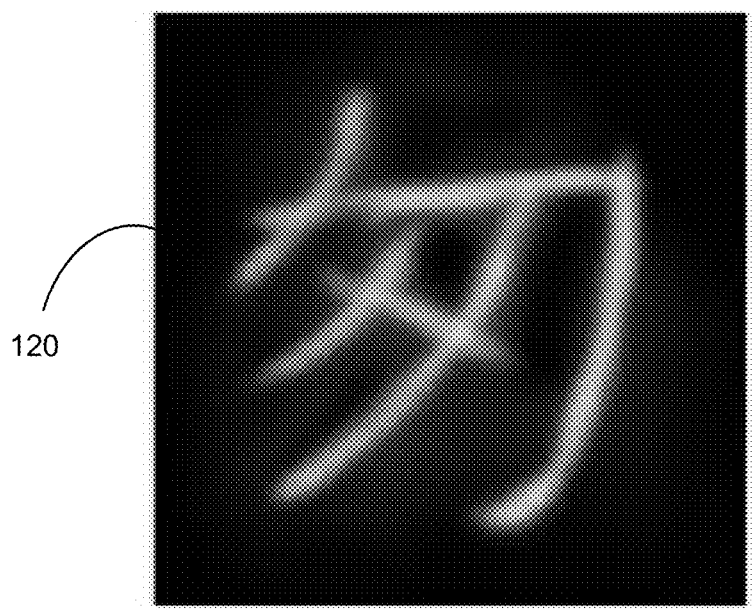
FIG. 1E

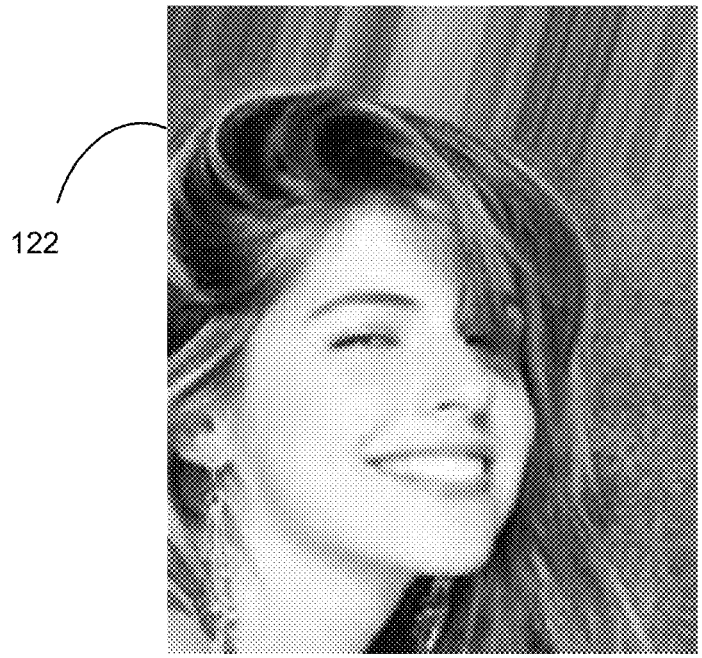
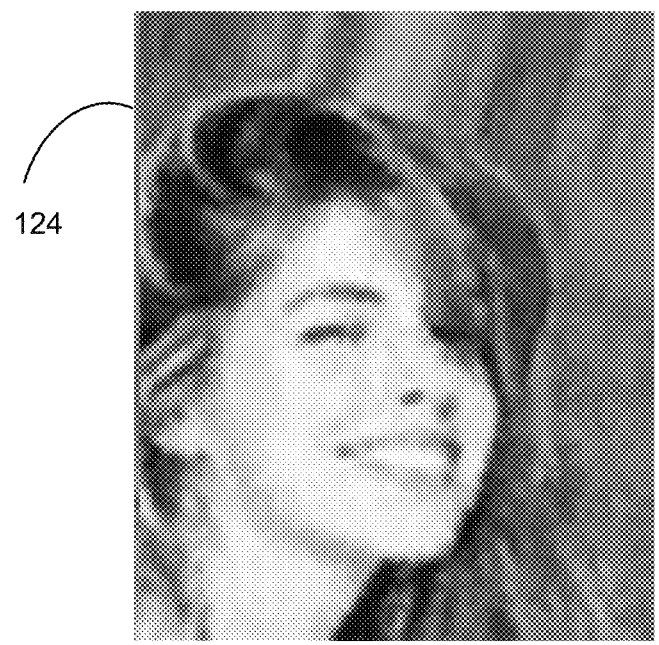
FIG. 1F

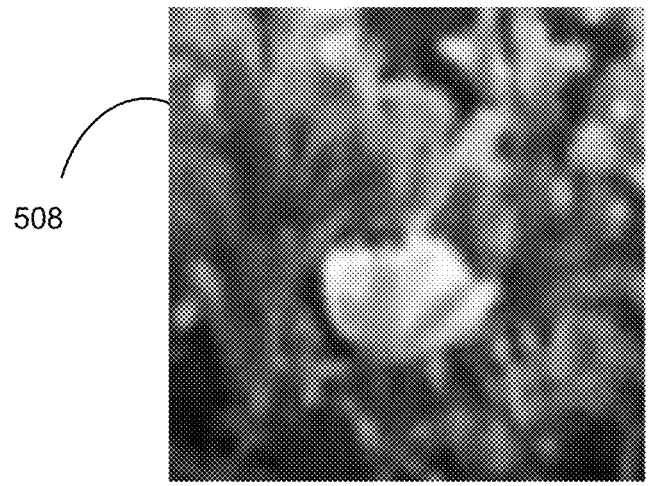
508
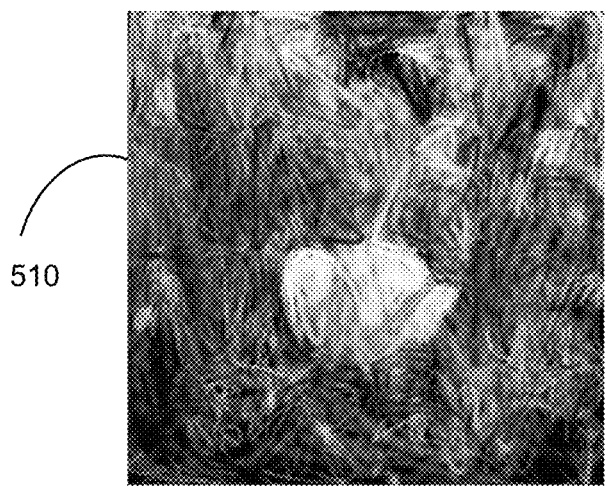
510
FIG. 5B

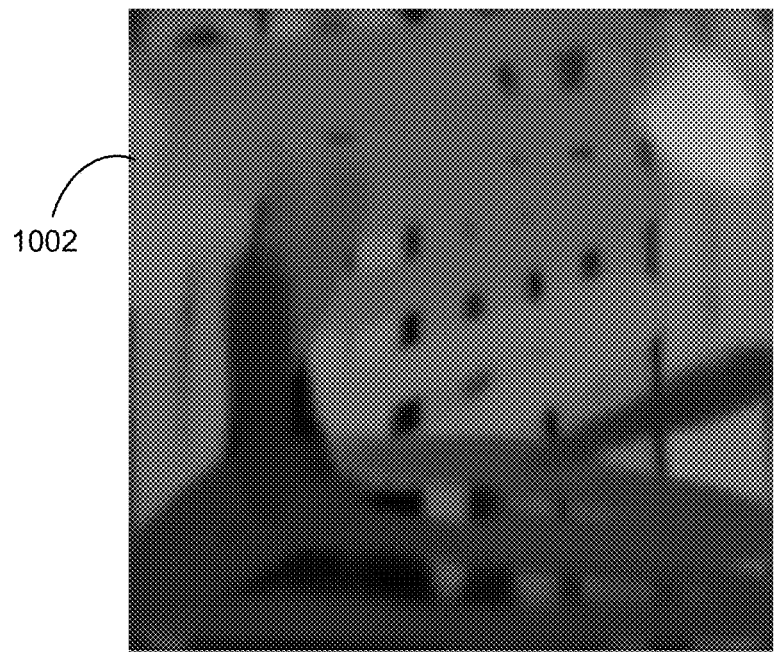
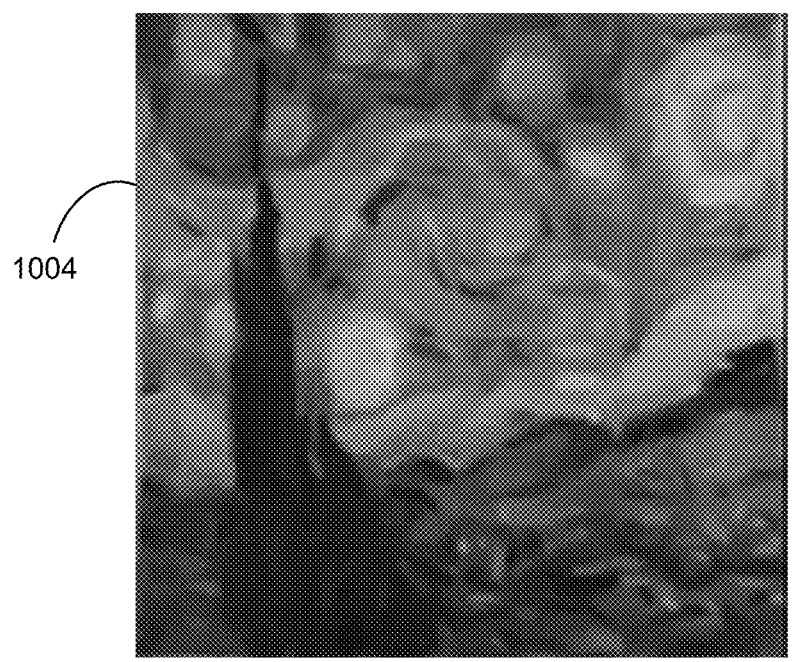
FIG. 10A

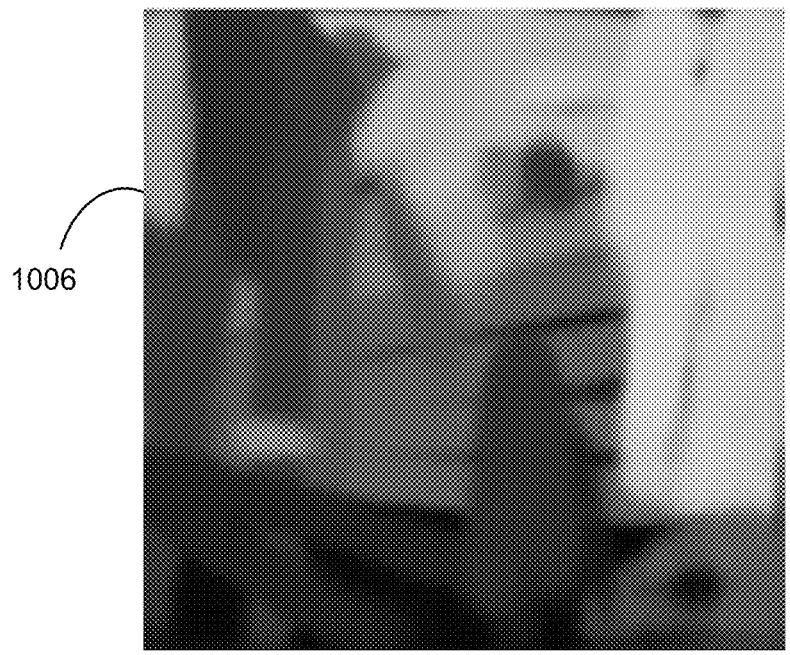
FIG. 10B

1100

GENERATE, USING A MACHINE LEARNING SYSTEM, A PAINTING AGENT FOR REPRODUCING IMAGES IN ACCORDANCE WITH A PAINTING STYLE, WHEREIN THE PAINTING AGENT IS CONFIGURED TO REPRODUCE AN IMAGE BY DETERMINING BRUSHSTROKES OF THE PAINTING STYLE THAT CORRESPOND TO FEATURES OF THE IMAGES, THE BRUSHSTROKES BEING DETERMINED FROM AN ACTION SPACE INCLUDING A SET OF BRUSHSTROKES THE PAINTING AGENT IS CONFIGURED TO RENDER WITHIN A USER INTERFACE
1102

DETERMINE A CONSTRAINT LIMITING AT LEAST ONE BRUSHSTROKE CORRESOPNDING TO A FEATURE OF THE IMAGE
1104

GENERATE A CONSTRAINED VERSION OF THE PAINTING AGENT FOR REPRODUCING IMAGES IN ACCORDANCE WITH THE PAINTING STYLE AND THE CONSTRAINT, WHEREIN THE CONSTRAINED VERSION OF THE PAINTING AGENT DETERMINES BRUSHSTROKES WITHIN A SUBSPACE OF THE ACTION SPACE OF THE PAINTING AGENT, THE SUBSPACE OF THE ACTION SPACE INCLUDING A SUBSET OF THE SET OF BRUSHSTROKES THAT CORRESPOND TO THE CONSTRAINT
1106

FIG. 11

LEARNED MODEL-BASED IMAGE RENDERING

FIELD

This application is related to training and implementing machine learning models to reproduce digital images in accordance with various painting styles and constraints.

BACKGROUND

Artificial intelligence has become ubiquitous in many different industries. One artificial intelligence tool, machine learning, has become customary for performing a variety of tasks. A machine learning model can perform a task by relying on patterns and inference learned from training data, without requiring explicit instructions to perform the task. Recent developments in machine learning have produced significant advancements in fields relating to computer graphics. In particular, new machine learning techniques have improved the performance of computer-based painting systems. In a computer-based painting system, a painting agent receives an image from a user and then reproduces the image as if the image were created by an artist using a particular painting material or style. For instance, a computer-based painting system can train a machine learning model to transform an image into a series of brushstrokes that appear to be painted or drawn using a particular material (such as watercolors, charcoal, markers, among others) and/or based on a particular artistic style (such as Impressionism, Cubism, Art Nouvea, among others). This transformation process may be referred to as non-photorealistic rendering (NPR).

While some computer-based painting systems are capable of outputting detailed and sophisticated non-photorealistic images, these systems may be limited in some cases. For instance, a machine learning model that renders images in accordance with a painting style or material may implement thousands or millions of steps. The task of training such a model may be computationally expensive, requiring large amounts of time and/or processing power. Thus, many painting systems cannot easily adapt to new painting styles or materials. Further, these painting systems may produce static outputs. For instance, a painting system may produce the same (or generally similar) output each time the system receives the same input. A user providing an image is unable to customize the output, or express their personal artistic style within the output.

New systems and techniques are needed for providing robust, adaptable, and customizable machine learning-based painting models.

SUMMARY

Image rendering systems and related techniques are described herein that train and implement machine learning models to reproduce digital images in accordance with various painting styles and constraints. For instance, a machine learning system can utilize an actor-critic based reinforcement learning technique to train a painting agent (e.g., a model that includes one or more neural networks) how to transform an image into a different artistic style with minimal loss between the original image and the transformed image. By modeling, via one or more additional neural networks, painting tools configured to render brushstrokes in accordance with various painting styles, the machine learning system can efficiently train multiple painting agents to reproduce images in accordance with the various painting styles. Further, the machine learning system can generate one or more constrained painting agents. A constrained painting agent is a painting agent that is further trained to reproduce images with brushstrokes that have one or more constraints or limitations. For instance, a constrained painting agent may control or limit characteristics such as the width, color, size, shape, and/or position of brushstrokes within a reproduced image. The machine learning system can generate a constrained painting agent by training an unconstrained painting agent to operate within a subspace of its own action space. The one or more constrained painting agents may provide users with robust, flexible, and customizable non-photorealistic painting systems.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 1A, FIG. 1B, FIG. 1C, FIG. 1D, FIG. 1E, and FIG. 1F are illustrations of examples of images reproduced by an image rendering system, in accordance with some examples provided herein;

FIG. 5A and FIG. 5B are illustrations of example images reproduced by an image rendering system, in accordance with some examples provided herein;

FIG. 10A and FIG. 10B are illustrations of example images reproduced by an image rendering system, in accordance with some examples provided herein;

FIG. 11 is a flowchart illustrating an example of a process for non-photorealistic image rendering, in accordance with some examples provided herein;

DETAILED DESCRIPTION

Figure 2:
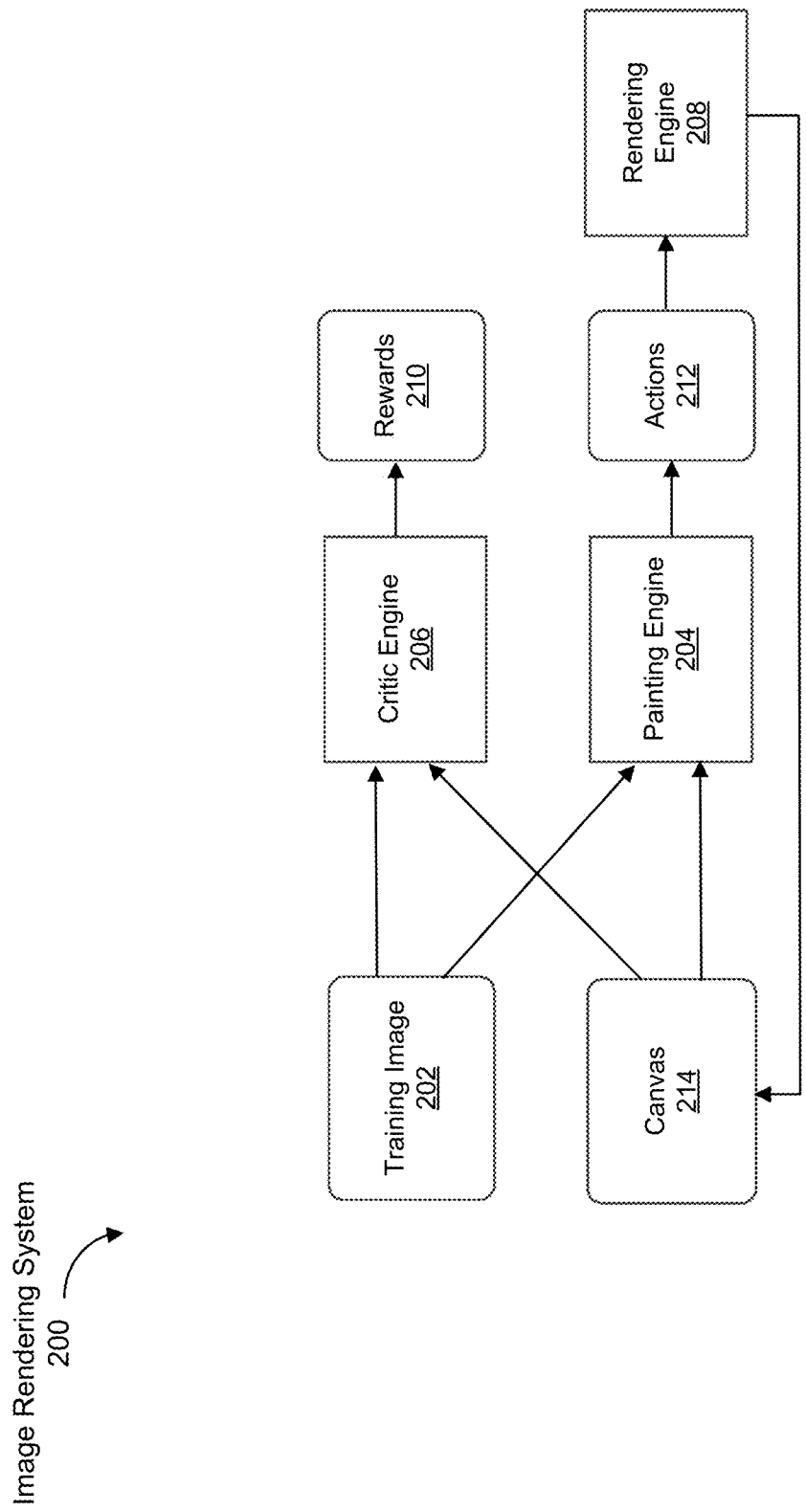
FIG. 2 is a block diagram illustrating an example of an image rendering system, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Artificial intelligence (AI) refers generally to the ability of a machine or system to mimic intelligent human behavior. AI has existed for many decades, but has become a widespread phenomenon in recent years. Machine learning is a sub-area of AI, in which a machine learning model is trained to perform one or more specific tasks. For instance, a machine learning model is trained to perform a target task by relying on patterns and inference learned from training data, without requiring explicit instructions to perform the task. Machine learning models have become customary in many devices and systems for performing various tasks, including categorizing data, translating text, detecting and preventing cyber attacks, recommending products, among others. Within the field of computer graphics, machine learning techniques can be used within computer-based painting systems. In a computer-based painting system, a painting agent receives an image (referred to as a reference image) from a user and then reproduces the image as if the image were created by an artist using a particular painting material or style. For instance, a computer-based painting system can train a machine learning model to transform an image into a series of brushstrokes that appear to be painted or drawn using a particular material (such as watercolors, charcoal, markers, among others) and/or based on a particular artistic style (such as Impressionism, Cubism, Art Nouvea, among others). This transformation process may be referred to as non-photorealistic rendering (NPR).

Despite recent advancements in machine learning technology, some machine learning systems are unable to reproduce digital images with the resolution and/or variation desired by users. For instance, a machine learning model that renders images in accordance with a painting style or material may implement thousands or millions of steps. The task of training such a model may be computationally expensive, requiring large amounts of time and/or processing power. Thus, many painting systems cannot easily adapt to new painting styles or materials. Further, these painting systems may produce static outputs. For instance, a painting system may produce the same (or generally similar) output each time the system receives the same input. A user providing an image is unable to customize the output, or express their personal artistic style within the output.

The painting systems and related techniques described herein can generate painting models that provide robust and customizable non-photorealistic rendering. These painting systems can generate the models using a variety of types of machine learning algorithms and techniques. In some cases, a painting system can utilize one or more neural networks to generate a painting model. The term "neural network," as used herein, can refer to a set of algorithms or steps designed to recognize patterns or relationships within a data set. Neural networks may include an input layer, an output layer, and one or more hidden layers. The hidden layers can process data provided to the input layer, and the output layer can output the result of the processing performed by the hidden layers. In one illustrative example, the output layer can output one or more brushstrokes corresponding to features of an input image. The number of hidden layers can be made to include as many layers as needed for the given application. In some cases, the hidden layers can include one or more interconnected nodes. Each node can represent a piece of information. Information associated with the nodes is shared among the different layers and each layer retains information as information is processed.

Information can be exchanged among nodes through node-to-node interconnections between the various layers. Nodes of the input layer can activate a set of nodes in the first hidden layer. For example, each of the input nodes of the input layer may be connected to each of the nodes of the first hidden layer. The nodes of the hidden layers can transform the data of each input node by applying filters (and in some cases other functions, such as pooling functions, non-linear activation functions, among others) to the data. In some cases, each hidden layer can include a number of channels of filters, such as a first channel including a first filter, a second channel including a second filter, and so on. In some cases, each channel can also include other functions, such as pooling functions, non-linear activation functions, among others. The data derived from the transformation can then be passed to and can activate the nodes of the next hidden layer, which can perform their own designated functions. Example functions performed by the filters or other functions include convolutional, up-sampling, data transformation, and/or any other suitable functions. The output of the hidden layer can then activate nodes of the next hidden layer, and so on. The output of the last hidden layer can activate one or more nodes of the output layer (or in some cases nodes of one or more fully connected layers), at which an output is provided. Nodes within the neural network can have multiple output lines, or a single output.

In some cases, each node or interconnection between nodes can have one or more tunable weights. Weights are a set of parameters derived from the training of the neural network. For example, an interconnection between nodes can represent a piece of information learned about the interconnected nodes. The interconnection can have a tunable weight that can be tuned during training (e.g., based on a training dataset), allowing the neural network to be adaptive to inputs and able to learn as more and more data is processed. Each weight can include a numeric value. In some cases, during a training iteration, a neural network can adjust the weights of the nodes by processing a training image and then analyzing the difference between the actual output of the neural network and the desired output of the neural network. In the context of an image rendering system, the desired output may correspond to an accurate replication or imitation of an input image in accordance with a particular painting style. In other words, the goal of training is to generate a trained neural network that outputs reproduced images that correspond to (e.g., contain the same features or elements as) input images, but appear to have been drawn, painted, or otherwise generated using a different or particular painting style. The weights of a neural network may be initially randomized before the neural network is trained. For a first training iteration for the neural network, the output will likely include values (e.g., representing brushstrokes) that do not produce accurate and/or desired outputs. The process of processing training images and updating parameters of the neural network can be repeated for a certain number of iterations for each set of training images until the neural network is trained well enough so that the weights (and/or other parameters) of the layers are accurately tuned.

The disclosed image rendering systems can update the weights of nodes within a neural network using a variety of training mechanisms and techniques. In one illustrative example, an image rendering system can utilize a reinforcement learning system. In some cases, a reinforcement learning system can train a neural network to produce desired outputs by configuring the neural network to maximize a reward associated with each action (e.g., step) performed by the neural network. Depending on the desired output of the neural network, the actions and associated rewards may take a variety of forms. In reference to the disclosed image rendering systems, an action may include reproducing a portion of a reference image. Specifically, an action may include determining and rendering a brushstroke corresponding to a feature of the input image. The reward may correspond to one or more loss measurements that quantify the visual difference between the reproduced image (after the brushstroke is rendered) and the reference image. In one example, the reward may correspond to the difference (or normalized difference) between the loss measurement of the current (most recently performed) step and the loss measurement of the previous step. The loss measurements may be determined using any type or form of loss function, including an L1 loss function, an L2 loss function, a cross-entropy loss function, a dice loss function, a KL divergence loss function, a Wasserstein generative adversarial network (WGAN), other type of generative adversarial network (GAN), among others.

In some cases, the reinforcement learning system can include and/or correspond to an actor-critic framework. In an actor-critic framework, an actor (e.g., a neural network or multiple neural networks) performs a series of actions based on an input. The actions are determined using a policy function implemented by the actor. As will be explained in more detail below, an actor within the disclosed image rendering systems can train and implement painting policies that correspond to various painting styles and/or constraints. In some cases, the actor determines an action to be performed within an action space. The action space can refer to and/or represent each possible action that may be performed by the actor. For instance, the action space of an image rendering system may include brushstrokes of various sizes, colors, shapes, widths, curvatures, texts, transparencies, etc. that the image rendering system is capable of rendering within a user interface. In some cases, the action space corresponds to a multi-dimensional (e.g., 5 dimensional, 10 dimensional, 100 dimensional, etc.) vector space and each action corresponds to a vector within the vector space. In some examples, the actor can operate within an unconstrained action space. For example, an unconstrained actor can determine actions that correspond to any vector within a continuous vector space. In contrast, a constrained actor can operate within a constrained action space that corresponds to a subspace of the vector space. As will be explained in greater detail below, an image rendering system can train an unconstrained actor to operate as a constrained actor that reproduces images in accordance with one or more constraints (e.g., limitations to the color, length, width, position, etc. of a brushstroke).

In the actor-critic framework, the critic (e.g., an additional neural network) determines the reward associated with an action (or series of actions). In some cases, the critic can determine the rewards using a value function. The actor neural network can then update one or more of its parameters based on the reward. For instance, the actor neural network can adjust one or more weights assigned to nodes within the actor neural network in order to maximize the reward of subsequent steps. In one example, the actor neural network can adjust the weights of nodes in order to maximize the total cumulative reward corresponding to one iteration of processing a piece of training data. The actor neural network can update the weights of nodes (or other parameters) in various ways. In one illustrative example, the actor neural network can use a Deep Deterministic Policy Gradient (DDPG) method or other policy gradient method. When using a DDPG, the actor neural network can update its parameters based on the following equation (or a similar equation): $\nabla(J) = \nabla_{\mu(s/\theta)}(Q(s,\mu(s|\theta))\nabla_\theta(\mu(s|\theta))$, where $\theta$ is the actor neural network's parameters, $\mu$ is the actor neural network, Q is the critic neural network, and s is the state of the action space.

The actor and critic neural networks may correspond to any type or combination of neural networks, including deep neural networks, fully connected neural networks, convolutional neural networks (CNNs), autoencoders, deep belief nets (DBNs), Recurrent Neural Networks (RNNs), among others. In one illustrative example, at least one of the critic neural network and/or the actor neural network correspond to a CNN that includes a series of hidden layers, such as one or more convolutional layers, one or more nonlinear layers (e.g., rectified linear unit (ReLU) layers), one or more pooling layers (for downsampling), and one or more fully connected layers.

The image rendering systems and related techniques described herein can utilize actor-critic based reinforcement learning systems to efficiently train painting agents for reproducing images in accordance with a wide variety of painting styles and constraints. Once trained, the painting agents can be integrated into user-facing applications. For instance, a user can provide, to an application, an image to be reproduced. The application can enable the user to customize the reproduced image by selecting a painting style, as well as one or more constraints. An image rendering system that is part of and/or in communication with the application can retrieve or access a painting agent corresponding to the painting style and the constraints selected by the user. The image rendering system can then determine a set of brushstrokes using the painting agent and render the brushstrokes within a user interface visible to the user. In some cases, the user can direct the image rendering system to re-render the image using different combinations of painting styles and/or constraints, enabling the user to fully customize the image based on their personal artistic style.

FIG. 1A, FIG. 1B, FIG. 1C, FIG. 1D, FIG. 1E, and FIG. 1F illustrate various examples of reproduced images output by the disclosed image rendering systems. In one embodiment, an image 102 in FIG. 1A corresponds to a reference image (e.g., an image provided by a user). A reproduced image 104 in FIG. 1A corresponds to the image 102 reproduced in accordance with a "watercolor" style. A reproduced image 106 in FIG. 1B corresponds to the image 102 reproduced in accordance with a "pencil" style. A reproduced image 108 in FIG. 1B corresponds to the image 102 reproduced in accordance with a "marker" style. A reproduced image 110 in FIG. 1C corresponds to the image 102 reproduced in accordance with a "charcoal" style. A reproduced image 112 in FIG. 1C corresponds to the image 102 reproduced in accordance with an "Impressionism" style. A reproduced image 114 in FIG. 1D corresponds to the image 102 reproduced in accordance with a "bulk" style. In addition, a reproduced image 116 in FIG. 1D corresponds to the image 102 reproduced in accordance with a "calligraphy" style. In some cases, a different painting agent may generate each of these reproduced images. For example, each painting agent may be trained to reproduce images in accordance with a single painting style. Alternatively, a single painting agent may be trained to reproduce images in accordance with two or more painting styles.

FIG. 1E and FIG. 1F illustrate additional types of images that may be reproduced by the disclosed image rendering systems. For example, an image 118 and a corresponding reproduced image 120 in FIG. 1E include a Japanese character. An image 122 and a corresponding reproduced image 124 in FIG. 1F include a portrait. The disclosed image rendering systems may reproduce any additional or alternative type of image or content, including landscapes, handwritten letters and numbers, pictures of actual paintings or sketches, among others. In addition, the disclosed image rendering systems may reproduce images of any size, file format, resolution, color scheme, style, etc.

FIG. 2 illustrates an example image rendering system 200 for training an unconstrained painting agent. The image rendering system 200 includes various components, including a training image 202, a painting engine 204, a critic engine 206, a rendering engine 208, rewards 210, actions 212, and a canvas 214. The components of the image rendering system 200 can include software, hardware, or both. For example, in some implementations, the components of the image rendering system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing image rendering system 200.

While the image rendering system 200 is shown to include certain components, one of ordinary skill will appreciate that the image rendering system 200 can include more or fewer components than those shown in FIG. 2. For example, the image rendering system 200 can include, or can be part of a computing device that includes, one or more input devices and one or more output devices (not shown). In some implementations, the image rendering system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the image rendering system 200 can be implemented by and/or included in a computing device. In some cases, multiple computing devices can be used to implement the image rendering system 200. For example, a computing device used to implement the image rendering system 200 can include a personal computer, a tablet computer, a mobile device (e.g., a mobile phone or other mobile device), a wearable device (e.g., a smart watch, a virtual reality headset, an augmented reality headset, and/or other wearable device), a server or multiple servers (e.g., in a software as a service (SaaS) system or other server-based system), and/or any other computing device with the resource capabilities to perform the techniques described herein.

In some implementations, the image rendering system 200 can be integrated with (e.g., integrated into the software, added as one or more plug-ins, included as one or more library functions, or otherwise integrated with) one or more software applications, such as a search engine, a web browser, a design application (e.g., Adobe InDesign™, Adobe Illustrator™, Adobe Acrobat™, Adobe Photoshop™, Adobe After Effects™, among others), or other software application that allows a user (also referred to as an end-user) to view and/or create images. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the image rendering system 200 can be implemented in a suite of software applications.

In some cases, the image rendering system 200 corresponds to an actor-critic based reinforcement learning system that includes an actor and a critic. In these cases, the painting engine 204 can correspond to the actor and the critic engine 206 can correspond to the critic. For instance, the painting engine 204 can include one or more neural networks that implement a policy function corresponding to a painting policy, and the critic engine 206 can include one or more neural networks that implement a value function. The painting engine 204 and/or the critic engine 206 can improve, refine, or otherwise train the painting policy by reproducing one or more training images (such as the training image 202) in accordance with a painting style and then updating parameters of the painting policy based on loss measurements corresponding to visual differences between the reproduced images and the training images.

In some cases, the painting engine 204 can reproduce the training image 202 by determining actions 212, which include brushstrokes corresponding to features of the training image 202. The term "brushstroke," as used herein, can refer to a line and/or curve within a reproduced image. In some cases, the painting engine 204 can determine a brushstroke by determining a line and/or curve whose characteristics (such as dimensions, size, texture, transparency, curvature, color, and/or position within a user interface) correspond (or approximately correspond) to characteristics of one or more features within the training image 202. For example, referring to FIG. 1A, the painting engine 204 may determine a brushstroke that approximately corresponds to a flower petal within the image 102. The brushstroke may correspond to the entirety of the flower petal, the outline of the flower petal, or any other portion of the flower petal.

In some cases, each action (e.g., brushstroke) determined by the painting engine 204 can be defined by a vector a within the action space A of the painting engine 204. As an example, a brushstroke can be defined by the vector $\alpha_t=(x_0, y_0, x_1, y_1, x_2, y_2, p_0, p_1, w, R, G, B)$, where $\alpha_t$ is brushstroke vector corresponding to step t of the painting policy, $x_0$ is the initial x-axis coordinate of the brushstroke within a user interface, $y_0$ is the initial y-axis coordinate of the brushstroke within the user interface, $x_1$ is an intermediate x-axis coordinate of the brushstroke within the user interface, $y_1$ is an intermediate y-axis coordinate of the brushstroke within the user interface, $x_2$ is the final x-axis coordinate of the brushstroke within the user interface, $y_2$ is the final y-axis coordinate of the brushstroke within the user interface, $p_0$ is the pressure (e.g., transparency) of the brushstroke at the initial coordinates, $p_1$ is the pressure (e.g., transparency) of the brushstroke at the final coordinates, w is the width of the brushstroke, and R, G, and B are values defining the color of the brushstroke. The vector can include fewer of these variables and/or can include additional variables. In some cases, the vector can be normalized to a value within (0, 1). In addition, the vector can be determined within a continuous action space, or determined within a discrete action space. In some cases, a continuous action space allows for a greater range of brushstrokes determined by a painting policy, which can improve the precision, resolution, and overall quality of reproduced images output by the painting policy.

The painting engine 204 can determine the values of variables within a brushstroke vector in a variety of ways. In one example, the painting engine 204 can determine the x-axis and y-axis coordinates within the vector by determining a Bézier curve or other parametric curve that corresponds to the shape and/or outline of a feature within the training image 202. A Bézier curve refers to a parametric curve used to model smooth curves. A Bézier curve can include one or more Bézier segments, where each Bézier segment is defined by multiple points (e.g., a start point, an end point, and optionally one or more control points). These points may correspond to the x-axis and y-axis coordinates of the vector. Referring to the example brushstroke vector discussed above, the painting engine 204 can determine a quadratic Bézier curve, which is defined by three points. The painting engine 204 can determine Bézier curves of any alternative degree, such as linear or cubic Bézier curves. In addition, while Bézier segments and curves are used herein as examples of curves corresponding to brushstrokes, the painting agent 204 may additionally or alternatively use other forms of parametric segments and curves, such as Hermite curves, B-splines, non-uniform rational basis splines, Kappa-curves, Catmull-Rom splines, and the like.

The painting engine 204 can determine any number of brushstrokes corresponding to the training image 202. In some cases, the painting engine 204 can determine a predetermined number of brushstrokes, such as 5 brushstrokes, 10 brushstrokes, 50 brushstrokes, or 200 brushstrokes. Additionally or alternatively, the number of brushstrokes can be based on the type or complexity of the training image 202. For example, if the training image 202 corresponds to a relatively simple image (such as the Japanese character illustrated in FIG. 1E), the painting engine 204 can determine a relatively low number of brushstrokes (such as 5 or 10 brushstrokes). However, if the training image 202 corresponds to a relatively large, detailed, and/or complex image (such as the portrait shown in FIG. 1F), the painting engine 204 can determine a higher number of brushstrokes (such as 100 or 200 brushstrokes).

In some cases, the rendering engine 206 can render the brushstrokes determined by the painting engine 204 within the canvas 214. In one example, the rendering engine 208 can correspond to a neural renderer that includes one or more neural networks. For instance, the rendering engine 208 can include a series of fully connected neural networks and/or convolutional neural networks. In some cases, the rendering engine 208 can correspond to a model painting environment that simulates the brushstrokes determined by the painting engine 204, but does not necessarily display the brushstrokes visually (e.g., within a user interface). In some cases, modeling the brushstrokes in such a manner may require or involve less processing power or other computational resources than visually rendering the brushstrokes within a user interface. In addition, because the state of a neural network can be differentiable, modeling the brushstrokes with one or more neural networks may facilitate adjusting parameters of the neural network (e.g., using a gradient policy).

In some examples, the rendering engine 206 can render the brushstrokes in accordance with a painting style. A painting style may be defined by and/or correspond to brushstrokes having certain properties or characteristics. For instance, a "watercolor" painting style may include brushstrokes with one set of colors, shapes, curve patterns, and textures, while a "charcoal" painting style may include brushstrokes with another set of colors, shapes, curve patterns, and textures (although there may be some overlap between the brushstrokes of both painting styles). In some examples, the image rendering system 200 may implement a particular painting style by modeling the output of a painting tool (which can be referred to as a paintbrush) that has been configured to produce brushstrokes in accordance with the painting style. For instance, the rendering engine 208 may model the output of a painting tool provided by an open-source library such as MyPaint (or another natural media painting library). Alternatively, the image rendering system 200 can generate and/or train a painting tool (e.g., from scratch). In some cases, a painting tool can render a brushstroke using a blending function (or other synthetic brushstroke mechanism) corresponding to a painting style. As an example, due to differences in the blending functions implemented by two distinct painting tools, the painting tools may produce different outputs given the same input. Thus, the rendering engine 208 can facilitate training the painting engine 204 to reproduce images in accordance with a painting style by using one or more neural networks to model the output of a painting tool configured to produce brushstrokes in accordance with the painting style.

In some cases, training the painting engine 204 may involve comparing various states of the canvas 214 with the training image 202 while the rendering engine 206 reproduces the training image 202 within the canvas 214. For instance, as shown in FIG. 2, the input to the critic engine 206 may include the training image 202 and the canvas 214. This input (which may be referred to as the observation of the critic engine 206) can be expressed by the equation $o_t=(s^*, s_t)$, where $o_t$ is the observation at step t, $s_t$ is state of the canvas 214 at step t, and $s^*$ is the state of the training image 202. The critic engine 206 may determine a reward (one of rewards 210) corresponding to each observation during the process of reproducing the training image 202 (this process may be referred to as an action sequence). In some cases, each of rewards 210 may correspond to the difference between the loss measurement of one action (e.g., rendering a brushstroke within the canvas 214) and the loss measurement of the previous action. For example, the reward may be determined using the equation $$r_t = \frac{L(s_{t-1}, s^*) - L(s_t, s^*)}{L(s_0, s^*)},$$

where $r_t$ is the reward at step t, L is the loss function used to determine loss measurements, $s_t$ is the state of the canvas 214 at step t, $s_{t-1}$ is the state of the canvas 214 at step t-1, $s^*$ is the state of the training image 102, and $s_0$ is the initial state of the canvas 214 (e.g., a blank canvas). The loss function L may include or correspond to any type or form of loss function, including an L1 loss function, an L2 loss function, a cross-entropy loss function, a dice loss function, a KL divergence loss function, a Wasserstein generative adversarial network (WGAN) loss function, other types of generative adversarial network (GAN) loss functions, among others. In some cases, dividing the numerator of the above equation by $L(s_0, s^*)$ normalizes each reward value such that $r_t \in (-\infty, 1)$.

In some cases, the painting engine 204 can use rewards 210 to update parameters of its painting policy (e.g., based on a DDPG or other gradient policy, as mentioned above). In one example, the parameters may be updated in a manner that maximizes the total reward accumulated throughout the process of reproducing a training image. For instance, the parameters may be updated to maximize the total discounted cumulative reward corresponding to one iteration of the painting policy, which may be defined by the equation $$q_t = \sum_{t=1}^{t_{max}} r_t \gamma^t,$$

where $q_t$ is the discounted cumulative reward at step t, $r_t$ is the reward at step t, $\gamma^t$ is the discount factor at step t, and $\gamma \in (0, 1)$. In some cases, the goal of training the painting policy in this manner may be to minimize loss (e.g., visual differences) between a training image and the final state of the reproduced training image (e.g., the final state of the canvas 214). The image rendering system 200 can achieve this goal using any number of training images to train the painting policy. For instance, the image rendering system 200 may process a certain number (such as 1,000, 10,000, or 100,000) of training images, iteratively updating parameters (e.g., weights and/or other parameters) of the painting policy after processing each training image. Additionally or alternatively, the image rendering system 200 may continue to process training images until the critic engine 206 determines that the loss corresponding to the final states of reproduced training images converges and/or is below a loss threshold.

Once the painting policy has been sufficiently trained, the image rendering system 200 may train a different painting policy that reproduces images in accordance with a different painting style. For instance, when training the different painting policy, the rendering engine 208 may model the output of a different painting tool. The image rendering system 200 may repeat this process using any number of painting tools, thereby efficiently generating multiple painting policies capable of reproducing images with different painting styles.

Figure 3A:
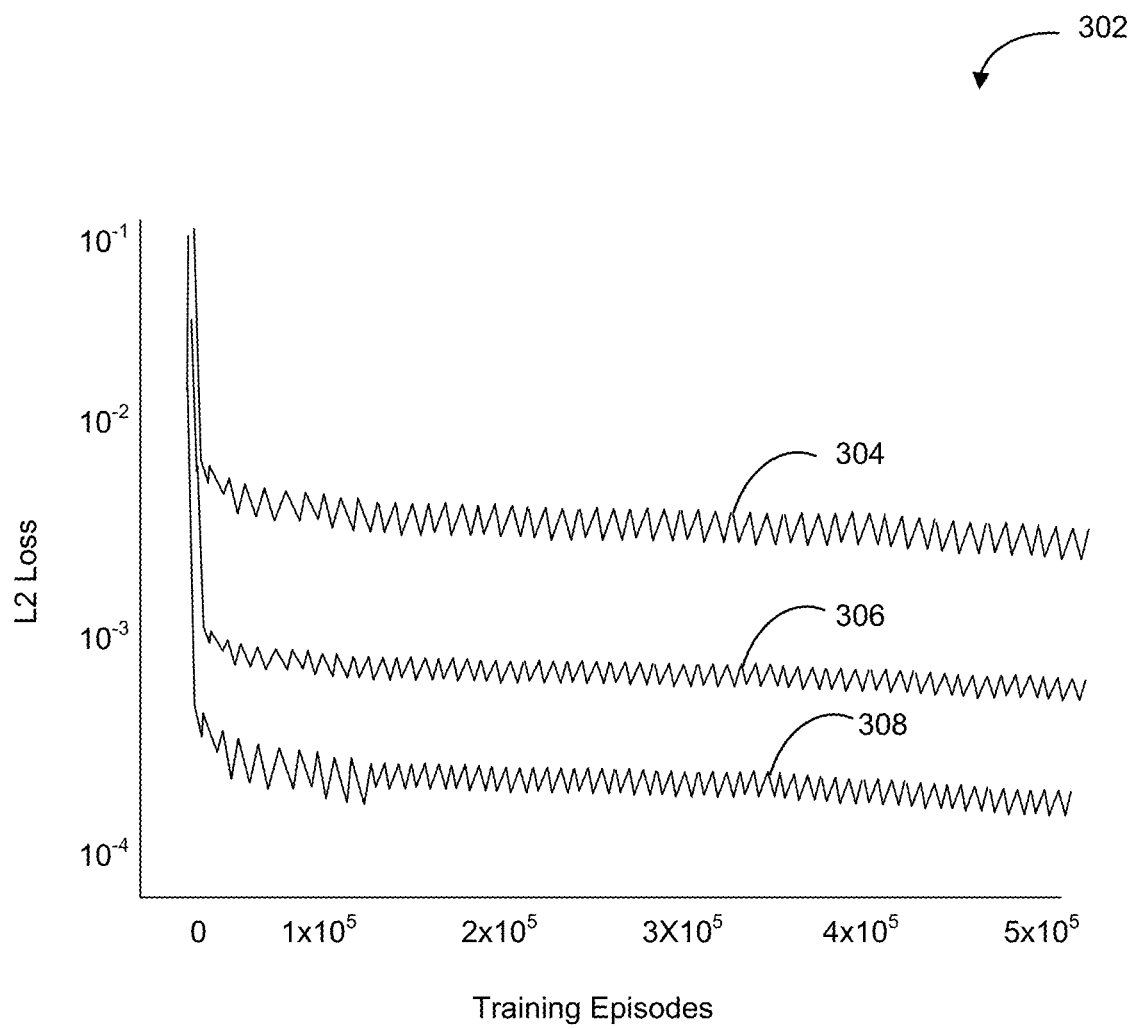
FIG. 3A and FIG. 3B are illustrations of example loss measurements corresponding to training painting policies, in accordance with some examples provided herein.

FIG. 3A illustrates a plot 302 that shows example loss measurements corresponding to the final states of reproduced reference images over the course of training various painting policies. In this example, the image rendering system 200 trains 3 different painting policies using 500,000 training images for each training process. A loss measurement 304 may correspond to one painting style (such as watercolor), a loss measurement 306 may correspond to a second painting style (such as charcoal), and a loss measurement 308 may correspond to a third painting style (such as pencils). The loss measurement may be determined using an L2 loss function (as shown in FIG. 3A) or any alternative loss function.

Figure 3B:
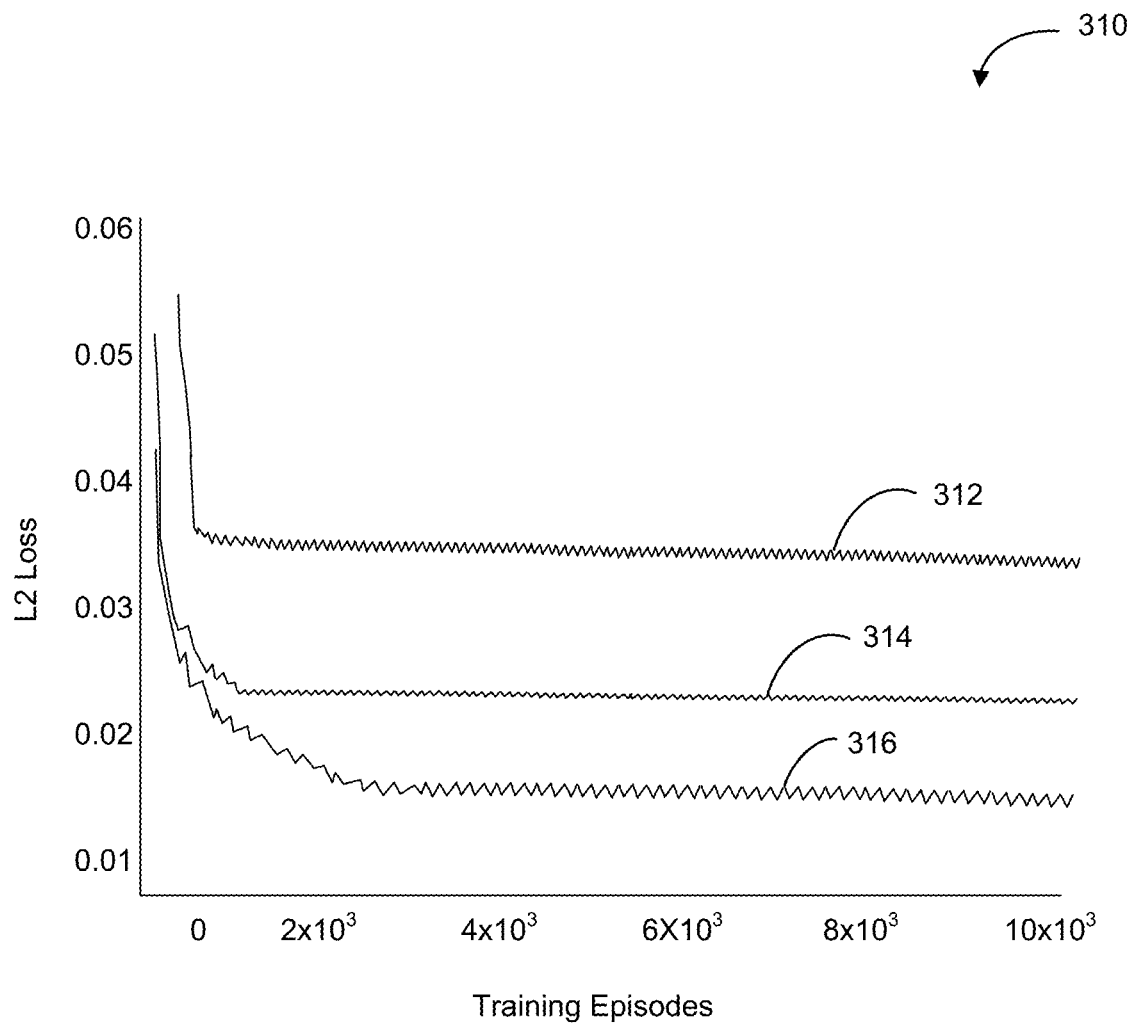

FIG. 3B illustrates a plot 310 that shows example loss measurements corresponding to the final states of reproduced reference images over the course of training a painting policy using various data sets. In this example, the image rendering system 200 trains a painting policy using 3 data sets that each include 10,000 images. A loss measurement 304 may correspond one data set (such as a MNIST data set), a loss measurement 314 may correspond to a second data set (such as a KanjiVG dataset), and a loss measurement 316 may correspond to a third data set (such as an ImageNet data set). The loss measurement may be determined using an L2 loss function (as shown in FIG. 3B) or any alternative loss function.

Figure 4:
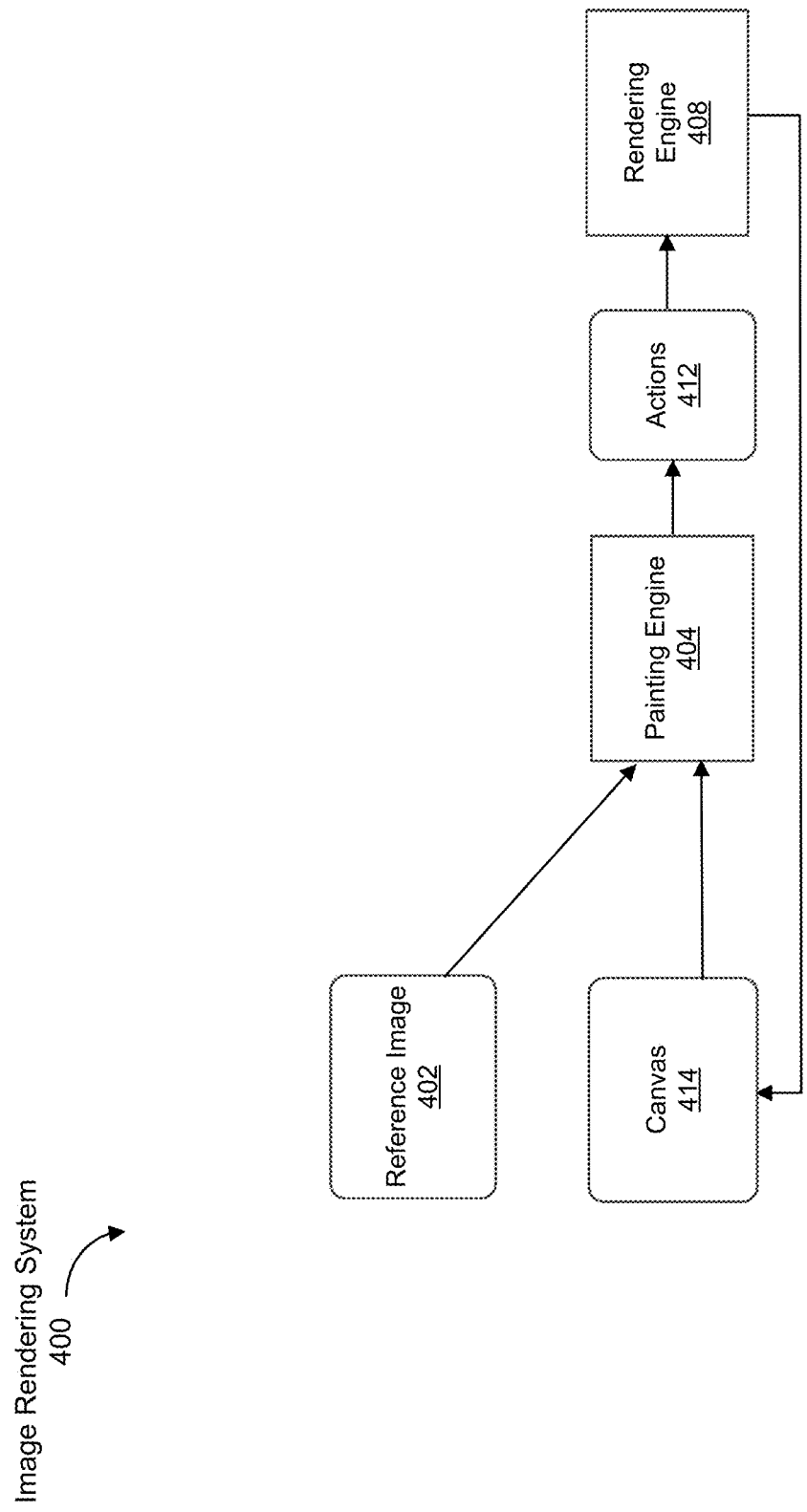
FIG. 4 is a block diagram illustrating an example of an image rendering system, in accordance with some examples provided herein.

After a painting policy is sufficiently trained, the painting policy may be used for reproducing reference images provided by users. This process may be referred to as inference (or roll-out). FIG. 4 illustrates an example image rendering system 400 for using a trained painting policy for inference. In some cases, one or more components of the image rendering system 400 may correspond to one or more components of the image rendering system 200 in FIG. 2. For example, the image rendering system 400 may include a painting engine 404, which may correspond to the painting policy trained by the image rendering system 200. Specifically, the image rendering system 400 may extract the final version of the neural network trained by the image rendering system 200 and implement the neural network within the painting engine 404. In some cases, this neural network may correspond to a painting agent. Given a reference image 402, the painting engine 404 may generate actions 412, which may include brushstrokes corresponding to features of the reference image 402. A rendering engine 408 may then render the brushstrokes within a canvas 414. In some cases, the canvas 414 may correspond to a user interface (e.g., a portion of an application displayed to a user). In these cases, the rendering engine 408 may include a "real" renderer, instead of the neural renderer corresponding to the rendering engine 208 in FIG. 2. For instance, the rendering engine 408 may graphically or visually render actions 412, rather than simulating the actions using a neural network. In addition, as shown in FIG. 4, the image rendering system 400 may not include a critic (such as the critic 206 in FIG. 2). Because the painting policy implemented by the painting engine 404 is considered to be fully trained, a critic may be unnecessary during inference.

The image rendering system 400 may be implemented in variety of ways and/or contexts. In one illustrative example, the image rendering system 400 may be integrated with a user-facing application configured for image rendering (such as Adobe InDesign™, Adobe Illustrator™ Adobe Acrobat™, Adobe Photoshop™, Adobe After Effects™, among others). In this example, the image rendering system 200 in FIG. 2 may train a painting policy while implemented by one or more servers (e.g., backend servers or web-based servers) managed by the application. The trained painting policy (corresponding to the painting engine 404) may then be incorporated into the application. In some cases, the application may be configured to run on a user device (such as a desktop, laptop, smart phone, mobile phone, tablet device, among others). In one example, the painting policy may be stored and/or implemented using hardware and/or software of the user device. Additionally or alternatively, the painting policy may be stored and/or implemented on the server and accessed by the user device via an interface of the application. As mentioned above, the image rendering system 200 may be used to train multiple painting policies that reproduce images in accordance with various painting styles. In some cases, all or a portion of these painting policies can be incorporated into the application. For instance, the application can provide an interface that enables a user to input (e.g., upload) an image and then select a particular painting style in which to reproduce the image.

Figure 5A:
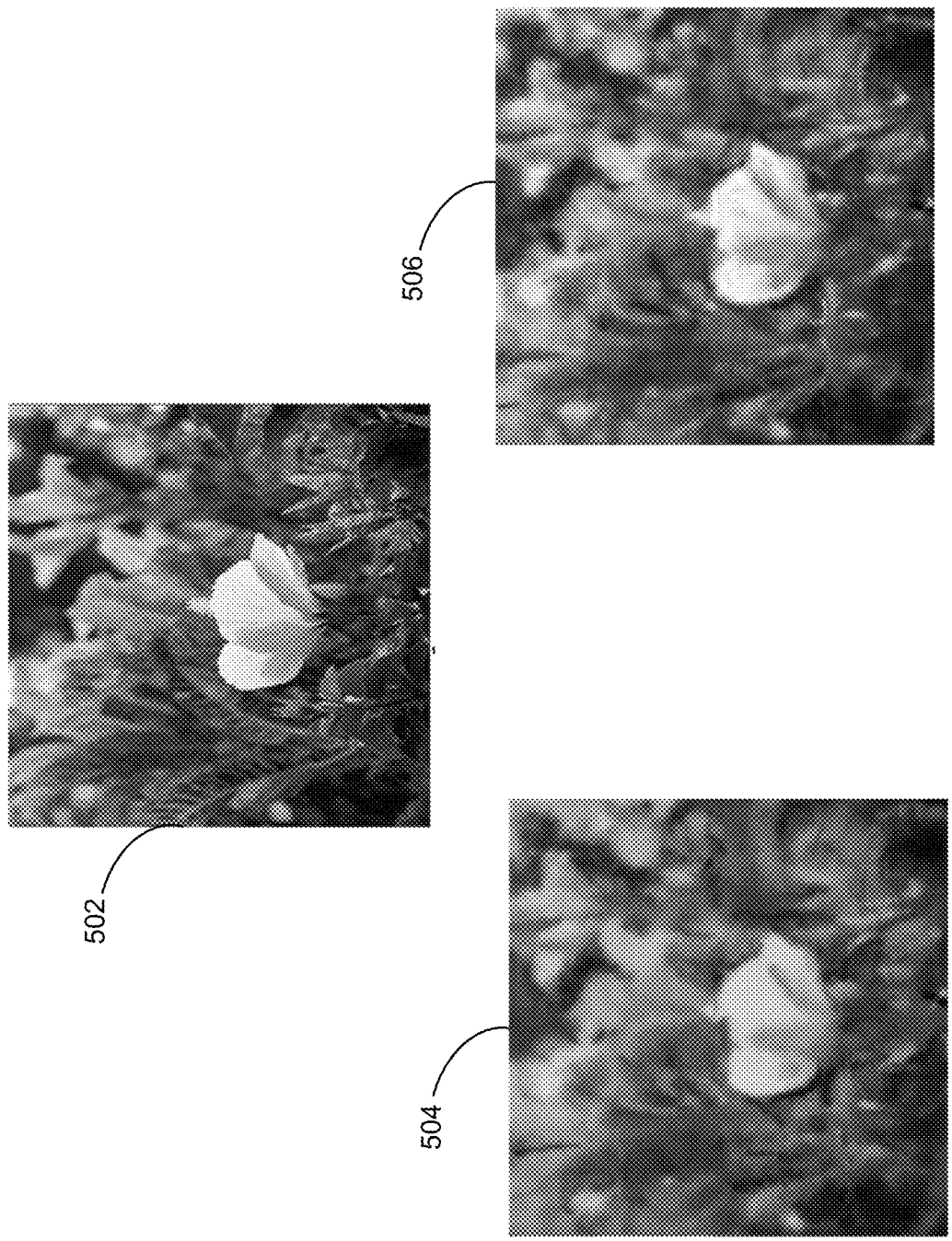

As mentioned above, the disclosed image rendering systems may generate constrained painting agents. A constrained painting agent may reproduce images in accordance with a painting style, as well as in accordance with one or more constraints that limit and/or define all or a portion of the brushstrokes within the reproduced images. Various characteristics of a brushstroke may be constrained, including the color of the brushstroke, the color palette from which the color of the brushstroke is selected, the width of the brushstroke, the location of the brushstroke, the length of the brushstroke, among others. In some cases, a user may provide input indicating one or more constraints to be implemented while an image is reproduced. This input may be provided before the image is reproduced (e.g., before a painting agent generates brushstrokes corresponding to the image) and/or while the image is being reproduced (e.g., while the painting agent is generating or rendering brushstrokes corresponding to the image). As an illustrative example, a user may provide, to a painting agent, a desired brushstroke width before an image is reproduced. Additionally or alternatively, the user may direct the painting agent to render one or more brushstrokes in a selected location while the painting agent is reproducing the image. FIG. 5A and FIG. 5B illustrate examples of images reproduced in accordance with constraints. Specifically, an image 502 in FIG. 5A corresponds to a reference image. A reproduced image 504 in FIG. 5A corresponds to the image 502 reproduced in accordance with a "low contrast color" constraint. A reproduced image 506 in FIG. 5A corresponds to the image 502 reproduced in accordance with a "high contrast color" constraint. A reproduced image 508 in FIG. 5B corresponds to the image 502 reproduced in accordance with a "large brushstroke" constraint. A reproduced image 510 in FIG. 5B corresponds to the image 502 reproduced in accordance with a "narrow brushstroke" constraint.

In some cases, a constrained painting policy implemented by a constrained painting agent may determine brushstrokes within a subspace of an action space of an unconstrained painting policy. For instance, given an action space A of an unconstrained painting policy, a constrained painting policy may have an action space C, where C corresponds to a subspace of A. C may include or be defined by a vector c corresponding to the constraint. The subtraction of C from A may be referred to as A'. In some cases, each brushstroke vector determined by the constrained painting policy may correspond to the concatenation of c and a vector a' within A'. For instance, each brushstroke vector $\alpha_c$ may be defined by the equation $\alpha_c = a' \oplus c$, where $a' \in A'$ and $c \in C$. In one illustrative example, a constrained painting policy may limit the color of at least one brushstroke to a color within a color palette defined by the color space $(R_{1-X}, G_{1-X}, B_{1-X})$. In this example, a' may correspond to $(x_0, y_0, x_1, y_1, x_2, y_2, p_0, p_1, w)$, which represent unconstrained variables within A'. In addition, c may correspond to $(R_1, G_1, B_1)$, which represent values randomly selected within the color space $(R_{1-X}, G_{1-X}, B_{1-X})$. Thus, the constrained brushstroke vector $\alpha_c$ may correspond to $\alpha_c = (x_0, y_0, x_1, y_1, x_2, y_2, p_0, p_1, w, R_1, G_1, B_1)$.

The disclosed image rendering systems may implement painting policies with any additional or alternative type of constraint, including multiple (e.g., combined) constraints. For instance, a constrained painting policy that constrains both the width and pressure of brushstrokes may determine a brushstroke as $\alpha_c = (x_0, y_0, x_1, y_1, x_2, y_2, p_{c0}, p_{c1}, w_c, R, G, B)$, where $p_{c0}$, $p_{c1}$, and $w_c$ are constrained values. As another illustrative example, a constrained painting policy may implement a constraint corresponding to extended and/or connected brushstrokes. To implement this constraint, the constrained painting policy may set the starting location of a brushstroke as the end location of the previously rendered brushstroke. For instance, a brushstroke at step t may correspond to a vector $\alpha_t = (x_0, y_0, x_1, y_1, x_2, y_2, p_c, p_c, w, R, G, B)$ and a brushstroke at step t+1 may correspond to a vector $\alpha_{t+1} = (x_2, y_2, x_3, y_3, x_4, y_4, p_c, p_c, w, R, G, B)$. The constrained painting policy may generate extended brushstrokes of any length, such as by connecting 2, 3, 4, or more brushstrokes.

Figure 6:
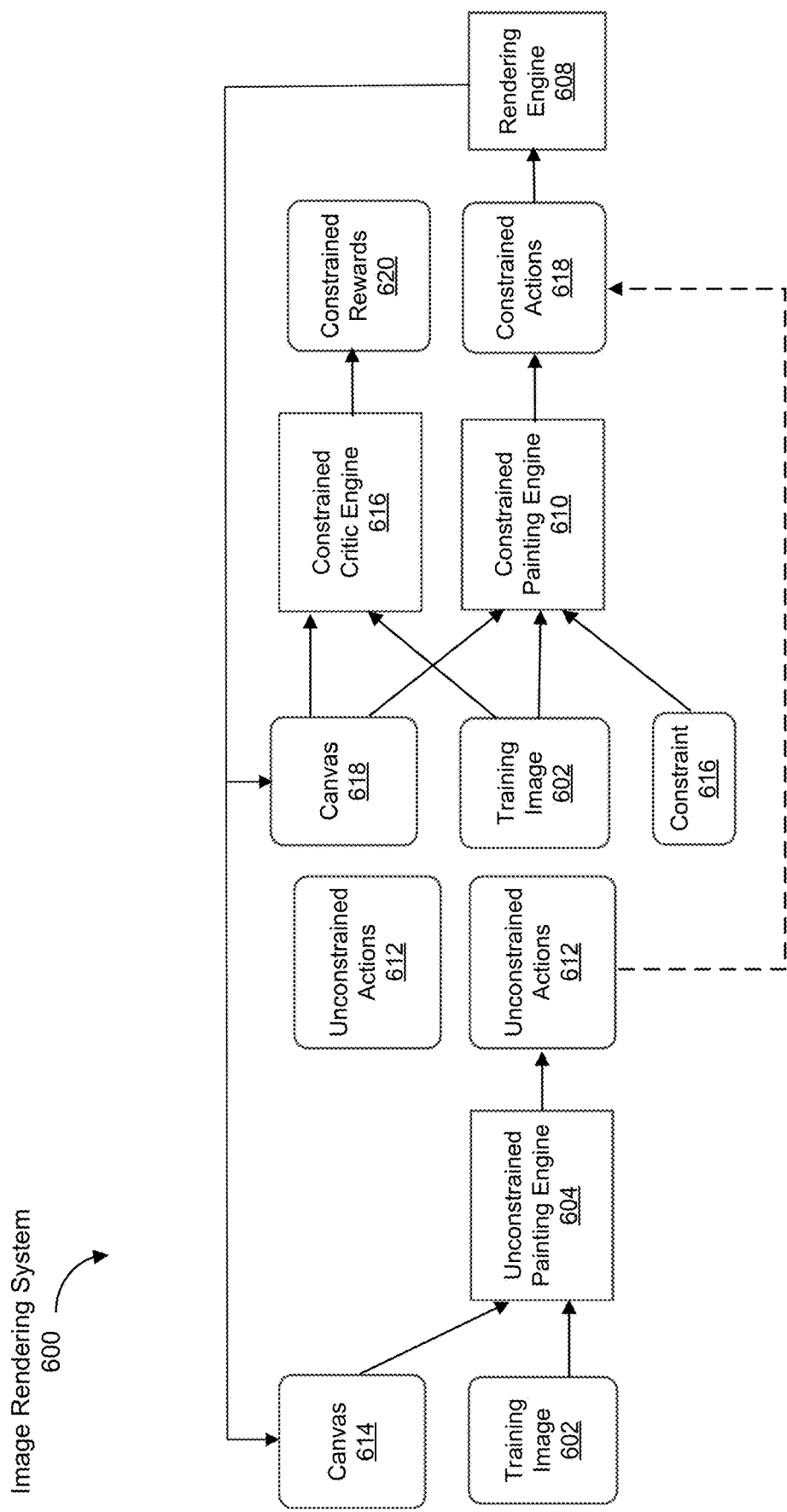
FIG. 6 is a block diagram illustrating an example of an image rendering system, in accordance with some examples provided herein.

In some cases, the disclosed image rendering systems may generate a constrained painting agent that reproduces images in accordance with a painting style and a constraint by retraining (or further training) an unconstrained painting agent that reproduces images in accordance with the painting style. FIG. 6 illustrates an example image rendering system 600 for generating constrained painting agents using unconstrained painting agents. In this example, the image rendering system 600 may cascade an unconstrained painting agent with a constrained painting agent. In some cases, an unconstrained painting engine 604 may correspond to an embodiment of the painting engine 404 in FIG. 4. Given a training image 602, the unconstrained painting engine 604 may determine unconstrained actions 612, which include unconstrained brushstrokes corresponding to features of the training image 602. In some cases, these brushstrokes may be rendered within a canvas 614 by a rendering engine 608, which may correspond to an embodiment of the rendering engine 208 in FIG. 2. Based on a constraint vector c corresponding to a constraint 616, the constrained painting engine 610 can map unconstrained actions 612 to constrained actions 618. For instance, for an action $\alpha_t$ output by the unconstrained painting engine 604, the constrained painting engine 610 can determine a constrained action $\alpha_{tc}$ by concatenating a vector $\alpha'_t$ with the constraint vector c, as discussed above. Brushstrokes corresponding to constrained actions 618 can then be rendered within a canvas 618 by the rendering engine 608.

In some cases, a constrained critic engine 616 can determine constrained rewards 620 by comparing various states of the canvas 618 with the training image 602 while the rendering engine 608 reproduces the training image 602 within the canvas 618. For example, the constrained critic engine 616 can take observations corresponding to $o_t=(s^*, s_t, c_t)$, where $o_t$ is the observation at step t, $s_t$ is state of the canvas 618 at step t, s* is the state of the training image 602, and $c_t$ is the constraint vector at step t. In some cases, the constrained critic engine 616 can upsample the constraint vector $c_t$ such that $c_t$ corresponds to a bitmap of the same size as $s_t$ and s*. Based on the observations, the constrained critic engine 616 can determine the constrained rewards 620, each of which may correspond to the difference between the loss measurement of one action and the loss measurement of the previous action (as discussed above in connection with training the painting engine 204 in FIG. 2). In some cases, the constrained painting engine 610 can then maximize the cumulative discounted reward of the constrained painting policy implemented by the constrained engine 610 by updating one or more parameters of a neural network corresponding to the constrained painting policy. In some cases, the goal of training the constrained painting policy in this manner may be to minimize loss between a training image and the final state of the reproduced training image. The image rendering system 600 can achieve this goal using any number of training images to train the constrained painting policy. For instance, the image rendering system 600 may process a certain number (such as 1,000, 10,000, or 100,000) of training images, iteratively updating parameters of the constrained painting policy after processing each training image. Additionally or alternatively, the image rendering system 600 may continue to process training images until the constrained critic engine 616 determines that the loss corresponding to the final states of reproduced training images converges and/or is below a loss threshold.

Once the constrained painting policy has been sufficiently trained, the image rendering system 600 can train a different constrained painting policy that reproduces images in accordance with a different constraint. For instance, when training the different constrained painting policy, the image rendering system 600 may input a different constraint. The image rendering system 600 may repeat this process using any number of constraints, thereby efficiently generating multiple painting policies capable of reproducing images in accordance with different constraints. As an illustrative example, if a design application enables a user to select between 5 different brushstroke pressure settings when creating their own images, the image rendering system 600 may train a set of painting policies that reproduce images in accordance with each of the different brushstroke pressure settings. Moreover, the image rendering system 600 may train constrained painting policies using unconstrained policies that reproduce images in accordance with various painting styles, which may facilitate creating a robust repository of painting policies that enable reproducing images with vast combinations of painting styles and constraints.

Figure 7:
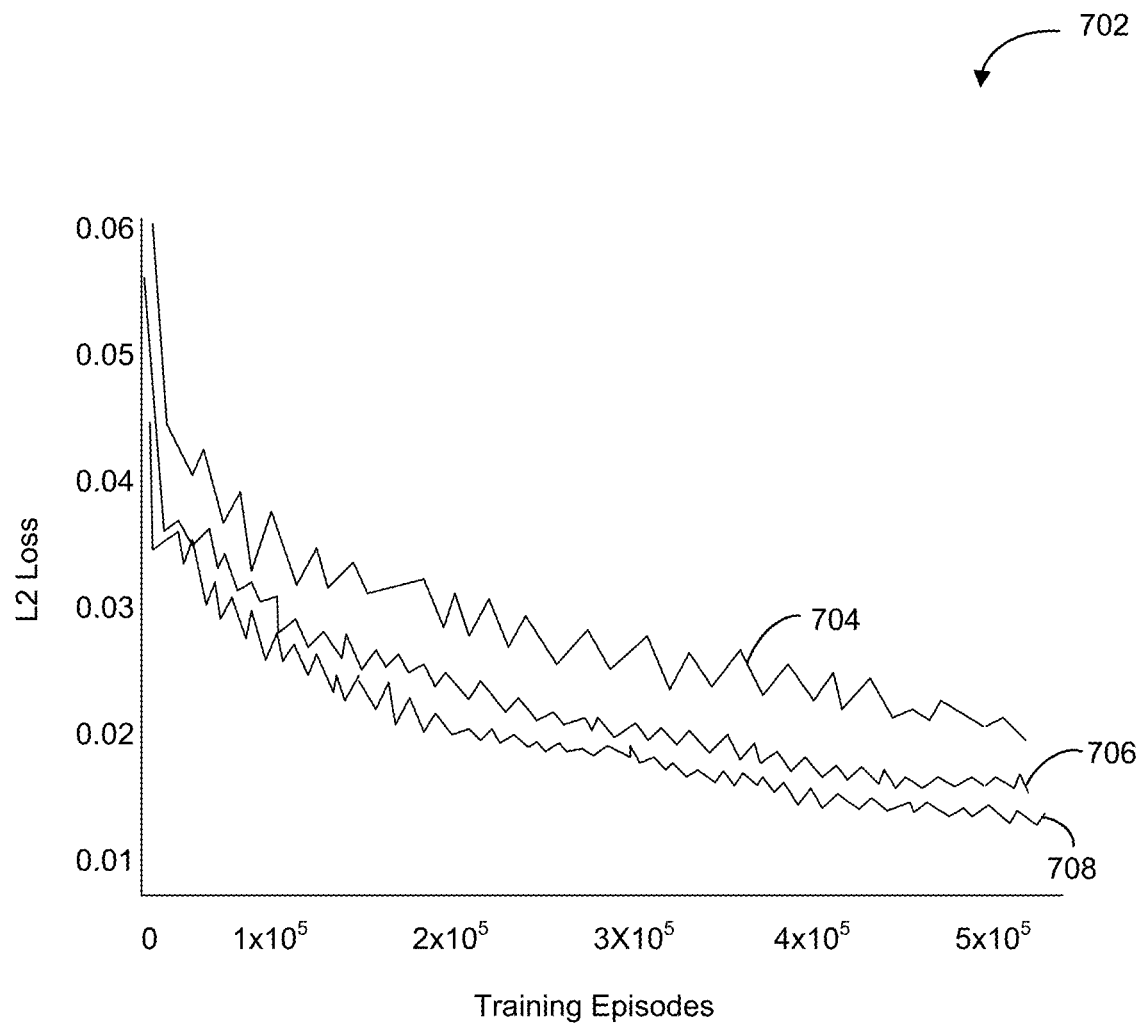
FIG. 7 is an illustration of example loss measurements corresponding to training painting policies, in accordance with some examples provided herein.

FIG. 7 illustrates a plot 702 that shows example loss measurements corresponding to the final states of reproduced reference images over the course of training various constrained painting policies. In this example, the image rendering system 600 trains 3 different constrained painting policies using 500,000 training images for each training process. A loss measurement 704 may correspond to one constraint (such as a particular color scheme), a loss measurement 706 may correspond to a second constraint (such as a particular brushstroke width), and a loss measurement 308 may correspond to a third constraint (such as generating extended brushstrokes). The loss measurement may be determined using an L2 loss function (as shown in FIG. 7) or any alternative loss function.

Figure 8:
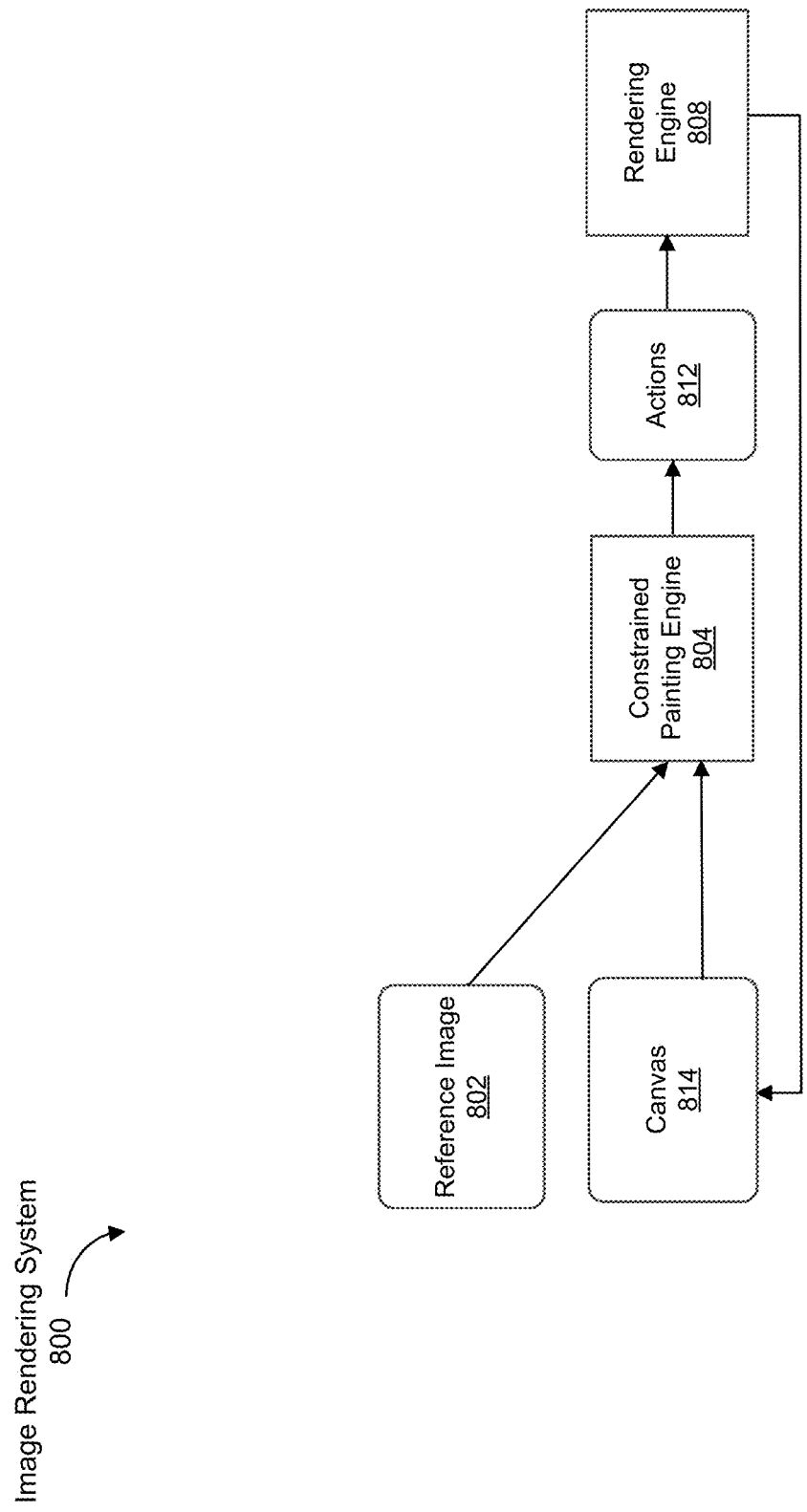
FIG. 8 is a block diagram illustrating an example of an image rendering system, in accordance with some examples provided herein.

After a constrained painting policy is sufficiently trained, the constrained painting policy may be ready for inference. FIG. 8 illustrates an example image rendering system 800 for using a constrained painting policy for inference. In some cases, one or more components of the image rendering system 800 may correspond to one or more components of the image rendering system 600 in FIG. 6. For example, the image rendering system 600 may include a constrained painting engine 804, which may correspond to the constrained painting policy trained by the image rendering system 600. Specifically, the image rendering system 800 may extract the final version of the neural network trained by the image rendering system 600 and implement the neural network within the constrained painting engine 804. Given a reference image 802 and a constraint 816, the constrained painting engine 804 may generate actions 812, which include constrained brushstrokes corresponding to features of the reference image 802. A rendering engine 808 may then render the brushstrokes within a canvas 814. In some cases, the canvas 814 may correspond to a user interface (e.g., a portion of an application displayed to a user). In these cases, the rendering engine 808 may include a "real" renderer, instead of the neural renderer corresponding to the rendering engine 608 in FIG. 6. For instance, the rendering engine 608 may graphically or visually render actions 612, rather than simulating the actions using a neural network.

In some cases, constraint 816 can correspond to a constraint the constrained painting engine 804 has been trained to implement (e.g., as discussed in connection with FIG. 6). Additionally or alternatively, constraint 816 can correspond to a constraint provided by a user while the image rendering system 800 reproduces the reference image 802. For instance, the rendering engine 808 may render one or more brushstrokes at a time within the canvas 814. In one illustrative example, the rendering engine 808 may simultaneously render 2 brushstrokes every 0.5 seconds. The rendering engine 808 may render brushstrokes as the brushstrokes are determined by the constrained painting engine 804, or after the constrained painting engine 804 has determined all or a portion of the brushstrokes corresponding to the reference image 802. While the brushstrokes are being rendered, the image rendering system 800 may detect user input corresponding to constraint 816. In response to detecting constraint 816, the constrained painting engine 804 can determine and/or modify one or more of actions 812 based on constraint 816. For instance, the constrained painting engine 804 may replace or modify the next action within the current action sequence such that the brushstroke vector of the next action at least partially resides within a constrained vector space corresponding to constraint 816.

As an illustrative example, constraint 816 may correspond to a desired location of a brushstroke within the canvas 816 selected by the user. The user may indicate the location in a variety of ways, such as by dragging a cursor (or a stylus, finger, etc.) over the user interface displaying the canvas 814 as if drawing a brushstroke. In this example, the constrained painting engine 804 may set coordinates of one or more subsequent brushstrokes based on coordinates of the location. For example, the constrained painting engine 804 may determine one or more brushstrokes (e.g., 3 or 4 brushstrokes) at or nearby the location corresponding to the user input. Constraint 816 may correspond to any additional or alternative type of constraint, such as a constraint of the color and/or width of one or more brushstrokes. As an illustrative example, constraint 816 may correspond to switching the color palette of a reproduced image from an unconstrained color palette to a grayscale color palette. In addition, constraint 816 may be temporary (e.g., applied to a predetermined number of subsequent brushstrokes) or permanent (e.g., applied to each remaining brushstroke). A user may provide any number of constraints while the reference image 802 is being reproduced. By implementing such real-time constraints, the image rendering system 800 may enable users to easily create highly customized and detailed reproduced images.

Figure 9:
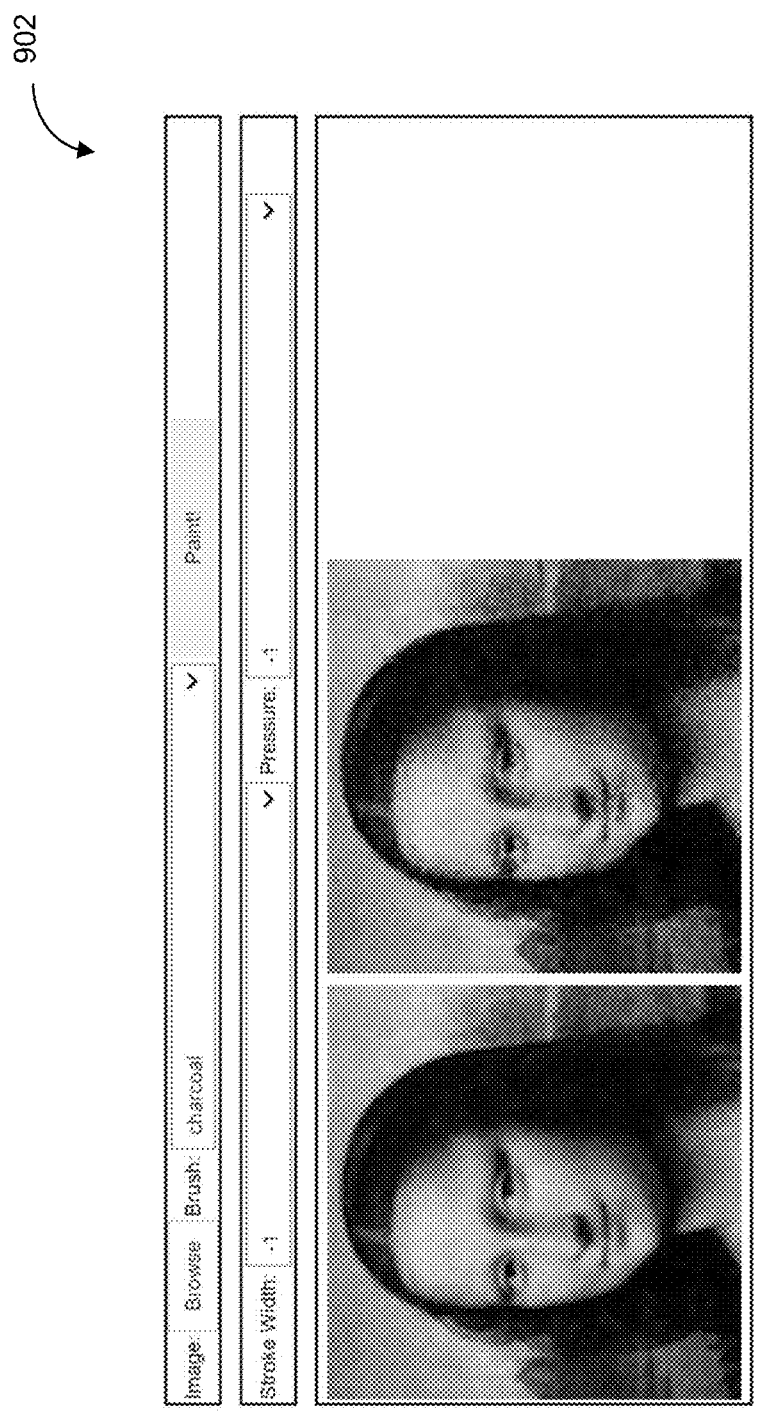
FIG. 9 is an illustration of an example user interface via which a user can customize a reproduced image, in accordance with some examples provided herein.

As discussed above in connection with the image rendering system 400, the image rendering system 800 may be implemented in variety of ways and/or contexts, such as by being integrated into a user-facing application configured for image rendering. FIG. 9 illustrates an example user interface 902 that shows how the disclosed image rendering systems may be integrated into a user-facing application. In this example, a user can provide a reference image that is to be reproduced in accordance with a painting style and/or one or more constraints. For instance, the user may be able to upload the reference image to the application, or direct the application to a file or storage location that stores the reference image. User interface 902 enables the user to customize the reproduction of the reference image in a variety of ways, such as by selecting options within one or more drop-down menu or other types of interactive menus. In the example of FIG. 9, the user interface 902 includes a drop-down menu listing painting styles (such as charcoal, watercolor, pencils, markers, Impressionism, etc.) supported by the application. The user interface 902 also includes drop-down menus listing brushstroke width values and brushstroke pressure values supported by the application. The user interface 902 may include any additional or alternative mechanism that enables a user to customize the reproduction of the reference image.

Once the user has provided input corresponding to the customization of the reference image, the user may direct the application to reproduce the reference image in accordance with the input. For example, the user may click on or otherwise select a button (such as the button labeled "Paint!" within the user interface 902) that directs the application to initiate an image reproduction process. In some cases, in response to detecting that the user has directed the application to initiate the image reproduction process, the application may retrieve and/or access a painting policy that has been trained to reproduce images in accordance with the input provided by the user. The application can then use the painting policy to determine and render a series of brushstrokes corresponding to the reference image. As discussed above, the application can render the reproduced image brushstroke-by-brushstroke. For example, the application can simulate the process of an actual person painting or drawing the reproduced image by iteratively rendering one or a few brushstrokes within a user interface at a time. In this example, the user interface 902 may allow the user to provide real-time constraints (such as specifying the location of one or more brushstrokes). For instance, the user interface 902 may be configured to detect input corresponding to a user dragging a cursor, stylus, or finger over an image being rendered. Alternatively, the application can render each brush stroke simultaneously, thereby providing the reproduced image to the user in a single action and with minimal delay.

The process of reproducing the reference image may be performed by a client device that runs the user-facing application and/or by a server that stores and/or trains painting policies. As an example, the client device may send, to the server, the reference image and the user input. Based on the information provided by the client device, the server may select an appropriate painting policy and return brushstrokes determined based on the painting policy. The client device may then render the brushstrokes within the user interface. The components and/or steps of the image rendering techniques disclosed herein may be implemented across the client device and the server in any additional or alternative manner.

In some cases, the disclosed image rendering systems may output detailed, high-resolution images using a coarse-to-fine strategy. To implement this strategy, the image rendering system 800 may downsample or otherwise reduce the size of a reference image, creating a low-resolution version of the reference image. The image rendering system 800 can then process the low-resolution version of the reference image. The output of this processing may correspond to a low-resolution reproduced image. In some cases, the image rendering system 800 may reproduce the low-resolution image using a predetermined number of brushstrokes (such as 5 brushstrokes, 50 brushstrokes, or 100 brushstrokes). In some examples, the predetermined number of brushstrokes may be lower than the number of brushstrokes typically implemented by the image rendering system 800 when processing high- or full-resolution reference images.

After reproducing the low-resolution version of the reference image, the image rendering system 800 can divide the reproduced image into multiple patches. Each patch may correspond to and/or include a distinct portion of the reproduced image. As an illustrative example, the image rendering system 800 may divide the reproduced image into four image patches by dividing the reproduced image in half vertically and then in half horizontally. The image rendering system 800 can then re-process each image patch. For instance, the image rendering system 800 can pass, to the constrained painting engine 804, the state of an image patch and the state of a corresponding patch of the original reference image. This input may correspond to an initial observation o=(s*, $\hat{s}$ ), where s* is the state of the corresponding patch of the original reference image and $\hat{s}$ is the state of the image patch (corresponding to the initial state of the canvas 814). The constrained painting engine 804 can then determine a set of actions based on the initial observation. Because the initial state of the canvas 814 is not blank, the coarse-to-fine strategy may facilitate determining brushstrokes with great detail and/or high resolution. In some cases, the image rendering system 800 can re-process each patch and then combine the outputs of each process, resulting in a high-resolution reproduced image.

FIG. 10A and FIG. 10B illustrate examples of images reproduced in accordance with the coarse-to-fine strategy. In these examples, a reproduced image 1002 in FIG. 10A may correspond to a low-resolution reproduced image and a reproduced image 1004 in FIG. 10A may correspond to the reproduced image 1002 after the reproduced image 1002 has been divided into patches and re-processed. Similarly, a reproduced image 1006 in FIG. 10B may correspond to a low-resolution reproduced image and a reproduced image 1008 in FIG. 10B may correspond to the reproduced image 1006 after the reproduced image 1006 has been divided into patches and re-processed. In an illustrative example, the reproduced images 1002 and 1006 may each include 100 brushstrokes and the reproduced images 1004 and 1008 may each be generated based on 16 patches reproduced using 100 brushstrokes. Thus, the reproduced images 1004 and 1008 may include 16 times more brushstrokes than the reproduced images 1002 and 1006. As shown in FIG. 10A and FIG. 10B, the reproduced images 1004 and 1008 may be more detailed and/or appear to be created with a more sophisticated style in comparison with their low-resolution counterparts.

An example of a process performed using the techniques described herein will now be described. FIG. 11 is a flowchart illustrating an example of a process 1100 for non-photorealistic image rendering. At block 1102, the process 1100 includes generating, using a machine learning system, a painting agent for reproducing images in accordance with a painting style, wherein the painting agent is configured to reproduce an image by determining brushstrokes of the painting style that correspond to features of the images, the brushstrokes being determined from an action space including a set of brushstrokes the painting agent is configured to render within a user interface.

In some examples, generating the painting agent can include training a painting policy using an actor-critic based reinforcement learning system. As an illustrative example, the painting engine 204 in FIG. 2 (corresponding to an actor) can utilize a neural network-based painting policy to determine a set of brushstrokes corresponding to features of a training image. A neural renderer (such as the rendering engine 208 in FIG. 2) can render the brushstrokes using a model of a painting tool that corresponds to the painting style. The critic engine 206 in FIG. 2 (corresponding to a critic) can determine rewards corresponding to all or a portion of the rendered brushstrokes. For instance, the critic engine 206 can determine loss measurements (e.g., using an L2 loss function or similar loss function) corresponding to the state of the reproduced image after each brushstroke is rendered. The painting engine 204 can update parameters of the neural network-based painting policy to minimize loss between reproduced images and training images. This process of updating parameters can be repeated until the painting policy is sufficiently trained.

At block 1104, the process 1100 includes determining a constraint limiting at least one brushstroke corresponding to a feature of the image. The constraint can limit the brushstroke in various ways, such as by defining the color, length, width, transparency, and/or position of the brushstroke. The constraint may be applied to each brushstroke within the reproduced image, or to a portion of the brushstrokes within the reproduced image. In some cases, the constraint may be provided or indicated by a user. In some examples, determining the constraint can include determining a constraint vector corresponding to the constraint within an action space of the painting policy.

At block 1106, the process includes generating a constrained version of the painting agent for reproducing images in accordance with the painting style and the constraint, wherein the constrained version of the painting agent determines brushstrokes within a subspace of the action space of the painting agent, the subspace of the action space including a subset of the set of brushstrokes that correspond to the constraint. In some examples, generating the constrained version of the painting agent includes using the constraint vector to map the set of brushstrokes within the action space of the painting agent to brushstrokes within the subspace of the action space. For instance, variables within the constraint vector may correspond to one or more variables within brushstroke vectors of the brushstrokes determined from the action space. In an illustrative example, the image rendering system 600 in FIG. 6 can receive the unconstrained actions 612, which include brushstroke vectors determined by an unconstrained painting agent. The image rendering system 600 can determine a portion of each brushstroke vector that does not reside within the subspace of the action space and concatenate these portions with the constraint vector. Using the concatenated vectors, the constrained painting engine 610 in FIG. 6 and the constrained critic engine 616 in FIG. 6 can train a neural-network based constrained painting policy implemented by the constrained painting engine 610. This constrained painting policy can be configured to reproduce images in accordance with the constraint, as well as the painting style corresponding to the unconstrained painting agent.

After the constrained painting policy is sufficiently trained, the constrained painting policy can be used to reproduce images within an image-rendering application. For instance, in response to receiving user input indicating a reference image that is to be reproduced in accordance with the painting style and the constraint, the application can retrieve or otherwise access (e.g., via a remote server) the constrained painting policy. The application can then determine brushstrokes corresponding to the features of the reference image using the constrained painting policy and render these brushstrokes within a user interface displayed to the user.

Figure 12:
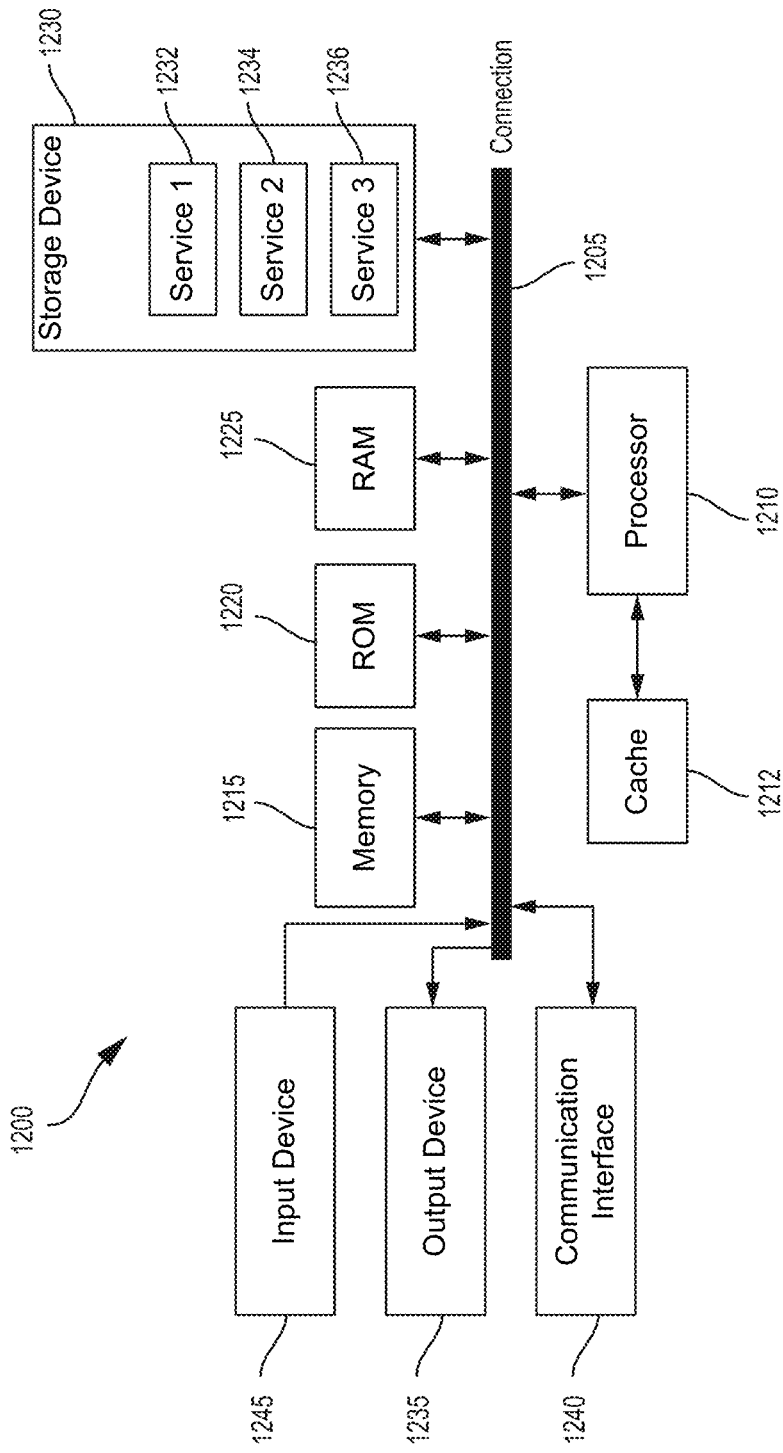
FIG. 12 is an example computing device architecture of an example computing device that can implement the various techniques described herein.

In some examples, the process 1100 may be performed by a computing device or apparatus, such as a computing device having the computing device architecture 1200 shown in FIG. 12. In one example, the process 1100 can be performed by a computing device with the computing device architecture 1200 implementing the image rendering systems shown in FIG. 2, FIG. 4, FIG. 6, and/or FIG. 8. In some cases, the computing device or apparatus may include a painting engine, a critic engine, a rendering engine, one or more processors, one or more microprocessors, one or more microcomputers, and/or other component(s) that is/are configured to carry out the steps of process 1100. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 1100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 illustrates an example computing device architecture 1200 of an example computing device which can implement the various techniques described herein. For example, the computing device architecture 1200 can implement the image rendering system 200 shown in FIG. 2, the image rendering system shown in FIG. 4, the image rendering system 600 shown in FIG. 6, and/or the image rendering system 800 shown in FIG. 8. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1200. Communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function. \

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" means A, B, or A and B, but items not listed in the set of A, B, and C can also be included in the set.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for rendering non-photorealistic images, comprising:
    generating, using machine learning system, a painting agent for reproducing images in accordance with a painting style, wherein the painting agent is configured to reproduce an image by determining brushstrokes of the painting style that correspond to features of the images, the brushstrokes being determined from an action space including a set of brushstrokes the painting agent is configured to render within a user interface;
    determining a constraint limiting at least one brushstroke corresponding to a feature of the image; and
    generating a constrained version of the painting agent for reproducing images in accordance with the painting style and the constraint, wherein the constrained version of the painting agent determines brushstrokes within a subspace of the action space of the painting agent, the subspace of the action space including a subset of the set of brushstrokes that correspond to the constraint.

2. The method of claim 1, wherein generating the painting agent includes adjusting parameters of a painting policy implemented by the painting agent, the painting policy corresponding to the painting style.

3. The method of claim 2, wherein adjusting the parameters of the painting policy includes:
    determining, using the painting policy, a brushstroke corresponding to a feature of a training image;
    rendering the brushstroke within a model of the user interface;
    determining a loss measurement corresponding to a visual difference between the training image and the model of the user interface after the brushstroke is rendered within the model of the user interface;
    determining, using the painting policy, an additional brushstroke corresponding to an additional feature of the training image;
    rendering the additional brushstroke within the model of the user interface;
    determining an additional loss measurement corresponding to a visual difference between the training image and the model of the user interface after the additional brushstroke is rendered within the model of the user interface;
    determining a difference between the loss measurement and the additional loss measurement; and
    adjusting at least one parameter of the painting policy to increase the difference between a corresponding loss measurement and a corresponding additional loss measurement during a subsequent rendering of the training image.

4. The method of claim 3, wherein the machine learning system renders the brushstroke and the additional brushstroke within the model of the user interface using a neural renderer, the neural renderer including at least one neural network.

5. The method of claim 3, wherein the machine learning system determines the loss measurement and the additional loss measurement using a generative adversarial network.

6. The method of claim 3, wherein the machine learning system includes an actor-critic framework, the actor-critic framework including:
    an actor corresponding to the painting agent, the actor including at least one neural network; and
    a critic configured to determine loss measurements.

7. The method of claim 1, wherein generating the constrained version of the painting agent includes:
    determining a set of variables corresponding to a brushstroke within the set of brushstrokes within the action space of the painting agent;
    determining at least one variable within the set of variables does not correspond to the constraint; and
    setting the variable within the set of variables to correspond to the constraint.

8. The method of claim 1, wherein generating the constrained version of the painting agent includes generating a plurality of constrained versions of the painting agent, each of the plurality of constrained versions of the painting agent being configured to reproduce images in accordance with the painting style and a different constraint.

9. The method of claim 8, wherein generating the constrained version of the painting agent further includes:
    receiving user input indicating the constraint; and
    in response to receiving the user input indicating the constraint, selecting, within the plurality of constrained versions of the painting agent, a constrained version of the painting agent configured to reproduce images in accordance with the painting style and the constraint.

10. The method of claim 1, further comprising, reproducing, using the constrained version of the painting agent, a reference image within the user interface in accordance with the painting style and the constraint.

11. The method of claim 10, wherein reproducing the reference image within the user interface includes:
    generating a low-resolution version of the reference image;

using the constrained version of the painting agent to reproduce the low-resolution version of the reference image in accordance with the painting style and the constraint, the reproduced low-resolution version of the reference image including a number of strokes;

dividing the reproduced low-resolution version of the reference image into a plurality of patches, each patch corresponding to a distinct region of the reproduced low-resolution version of the reference image; and providing the plurality of patches to the constrained version of the painting agent, wherein the constrained version of the painting agent uses a patch to reproduce a corresponding region of the reference image with the number of strokes.

12. A system for rendering non-photorealistic images, comprising:

one or more processors; and memory accessible to the one or more processors, the memory storing instructions, which upon execution by the one or more processors, cause the one or more processors to:

receive user input indicating a reference image that is to be reproduced in accordance with a painting style and a constraint, the constraint limiting at least one brushstroke corresponding to a feature of the reference image;

obtain a constrained painting agent for reproducing images in accordance with the painting style and the constraint, wherein the constrained painting agent is configured to determine brushstrokes within a subspace of an action space, the subspace of the action space including a subset of a set of brushstrokes that correspond to the constraint; and reproduce, using the constrained painting agent, the reference image within a user interface in accordance with the painting style and the constraint.

13. The system of claim 12, wherein the user input indicating the constraint includes at least one of:

a color of the at least one brushstroke;

a starting location of the at least one brushstroke within the user interface;

a width of the at least one brushstroke; and a length of the at least one brushstroke.

14. The system of claim 13, wherein the starting location of the at least one brushstroke corresponds to a final location of an additional brushstroke previously rendered within the user interface.

15. The system of claim 12, wherein receiving the user input indicating the constraint comprises receiving the user input while a brushstroke of the reproduced image is rendered within the user interface.

16. The system of claim 15, wherein reproducing the reference image within the user interface comprises:

determining a subsequent brushstroke within the subspace of the action space based on the constraint; and rendering the subsequent brushstroke within the user interface.

17. The system of claim 12, wherein the brushstrokes determined by the constrained painting agent include quadratic Bézier curves.

18. A non-transitory computer-readable medium having stored thereon instructions that, when executed by one or more processors, cause the one or more processors to:

generate, using an actor-critic based reinforcement learning system, a painting agent for reproducing images in accordance with a painting style, wherein the painting agent includes at least one neural network configured to reproduce an image by determining brushstrokes of the painting style that correspond to features of the images, the brushstrokes being determined from an action space including a set of brushstrokes the painting agent is configured to render within a user interface;

determine a constraint limiting at least one brushstroke corresponding to a feature of the image;

determine a subspace of the action space of the painting agent, the subspace of the action space including a subset of the set of brushstrokes that correspond to the constraint; and generate a constrained version of the painting agent for reproducing images in accordance with the painting style and the constraint by mapping the set of brushstrokes within the action space of the painting agent to the subset of the set of brushstrokes within the subspace of the action space.

19. The non-transitory computer-readable medium of claim 18, wherein mapping the brushstrokes within the set of brushstrokes to the brushstrokes within the subset of the set of brushstrokes includes:

determining a set of variables corresponding to a brushstroke within the set of brushstrokes within the action space of the painting agent;

determining at least one variable within the set of variables does not correspond to the constraint; and setting the variable within the set of variables to correspond to the constraint.

20. The non-transitory computer-readable medium of claim 19, wherein setting the variable within the set of variables to correspond to the constraint includes:

determining, within the subspace of the action space, a constraint vector corresponding to the constraint; and setting the variable within the set of variables as a value of a variable within the constraint vector.

* * * * *